US010552357B2

(12) United States Patent
Wu et al.

(10) Patent No.: US 10,552,357 B2
(45) Date of Patent: *Feb. 4, 2020

(54) MULTICHIP PACKAGE LINK

(71) Applicant: Intel Corporation, Santa Clara, CA (US)

(72) Inventors: Zuoguo J. Wu, San Jose, CA (US); Mahesh Wagh, Portland, OR (US); Debendra Das Sharma, Saratoga, CA (US); Gerald S. Pasdast, San Jose, CA (US); Ananthan Ayyasamy, Beaverton, OR (US); Xiaobei Li, Newcastle, WA (US); Robert G. Blankenship, Tacoma, WA (US); Robert J. Safranek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,492

(22) Filed: Nov. 22, 2017

(65) Prior Publication Data
US 2018/0300275 A1 Oct. 18, 2018

Related U.S. Application Data

(63) Continuation of application No. 15/039,452, filed as application No. PCT/US2013/077744 on Dec. 26, 2013, now Pat. No. 10,073,808.

(51) Int. Cl.
*G06F 13/40* (2006.01)
*G06F 13/42* (2006.01)
(Continued)

(52) U.S. Cl.
CPC ............ *G06F 13/4022* (2013.01); *G06F 1/10* (2013.01); *G06F 13/124* (2013.01);
(Continued)

(58) Field of Classification Search
CPC ......................... G06F 13/4022; G06F 13/4282
See application file for complete search history.

(56) References Cited

U.S. PATENT DOCUMENTS 7,337,250 B1   2/2008  Davis et al.
10,248,591 B2 * 4/2019  Safranek ............. G06F 12/0833
(Continued)

FOREIGN PATENT DOCUMENTS

CA    2326664 A1   10/1999
JP    S62260262 A  11/1987
(Continued)

OTHER PUBLICATIONS

Extended European Search Report for Application No. EP18165258.7, dated Jul. 6, 2018, 7 pages.
(Continued)

*Primary Examiner* — Tammara R Peyton
(74) *Attorney, Agent, or Firm* — Alliance IP, LLC

(57) ABSTRACT

Physical layer logic is provided that is to receive data on one or more data lanes of a physical link, receive a valid signal on another of the lanes of the physical link identifying that valid data is to follow assertion of the valid signal on the one or more data lanes, and receive a stream signal on another of the lanes of the physical link identifying a type of the data on the one or more data lanes.

25 Claims, 25 Drawing Sheets

(51) Int. Cl.
*G06F 13/12* (2006.01)
*G06F 15/173* (2006.01)
*G06F 1/10* (2006.01)

(52) U.S. Cl.
CPC ...... *G06F 13/4273* (2013.01); *G06F 13/4282* (2013.01); *G06F 15/173* (2013.01); *Y02D 10/14* (2018.01); *Y02D 10/151* (2018.01)

(56) References Cited

U.S. PATENT DOCUMENTS

| | | | | |
|---|---|---|---|---|
| 2006/0041696 | A1* | 2/2006 | Cherukuri | G06F 13/4278 710/100 |
| 2012/0079156 | A1* | 3/2012 | Safranek | G06F 12/0835 710/305 |
| 2015/0357306 | A1* | 12/2015 | Thottethodi | H04L 45/021 370/351 |

FOREIGN PATENT DOCUMENTS

| | | |
|---|---|---|
| JP | H06187105 A | 7/1994 |
| JP | 2006202281 A | 8/2006 |
| JP | 2007520832 A | 7/2007 |
| JP | 2014527329 A | 10/2014 |
| KR | 100776945 B1 | 11/2007 |
| KR | 100788299 B1 | 12/2007 |
| WO | 2013176951 A1 | 11/2013 |

OTHER PUBLICATIONS

First Office Action and Search Report for Chinese Patent Application No. CN201380081203.1, dated Jan. 25, 2018, 18 pages—English Translation Available.
Notice of Allowance for Japanese Patent Application No. JP2016535708, dated Nov. 30, 2018.
Notice of Allowance for Korean Patent Application No. KR20167013917, dated Aug. 29, 2018, 3 pages—English Translation Available.
Notice of Allowance for Russian Patent Application No. RU2016120702, dated Mar. 20, 2018, 10 pages—English Translation Not Available.
Second Office Action for Chinese Patent Application No. CN201380081203.1, dated Aug. 21, 2018, 6 pages—English Translation Available.
Second Office Action for Japanese Patent Application No. JP2016535708, dated May 15, 2018, 9 pages—English Translation Available.
Second Office Action for Russian Patent Application No. RU2016120702, dated Nov. 1, 2017, 10 pages—English Translation Available.
EPO; Office Action issued in EP Patent Application No. 18165258.7, dated Oct. 10, 2019; 4 pages.

* cited by examiner

|    | Lanes |     |     |     |     |     |     |     |     |     |     |     |     |     |     |     |     |     |
|----|----|-----|-----|-----|-----|-----|-----|-----|-----|-----|-----|-----|-----|-----|-----|-----|-----|-----|
|    |    | 49 | 48 | 47 | 46 | 45 | 44 | 43 | 42 | 41 | 40 | 39 | 38 | 37 | 36 | 35 | 34 | 33 | 32 |
| UI | 1 | 392 | 384 | 376 | 368 | 360 | 352 | 344 | 336 | 328 | 320 | 312 | 304 | 296 | 288 | 280 | 272 | 264 | 256 |
|    | 2 | 393 | 385 | 377 | 369 | 361 | 353 | 345 | 337 | 329 | 321 | 313 | 305 | 297 | 289 | 281 | 273 | 265 | 257 |
|    | 3 | 394 | 386 | 378 | 370 | 362 | 354 | 346 | 338 | 330 | 322 | 314 | 306 | 298 | 290 | 282 | 274 | 266 | 258 |
|    | 4 | 395 | 387 | 379 | 371 | 363 | 355 | 347 | 339 | 331 | 323 | 315 | 307 | 299 | 291 | 283 | 275 | 267 | 259 |
|    | 5 | 396 | 388 | 380 | 372 | 364 | 356 | 348 | 340 | 332 | 324 | 316 | 308 | 300 | 292 | 284 | 276 | 268 | 260 |
|    | 6 | 397 | 389 | 381 | 373 | 365 | 357 | 349 | 341 | 333 | 325 | 317 | 309 | 301 | 293 | 285 | 277 | 269 | 261 |
|    | 7 | 398 | 390 | 382 | 374 | 366 | 358 | 350 | 342 | 334 | 326 | 318 | 310 | 302 | 294 | 286 | 278 | 270 | 262 |
|    | 8 | 399 | 391 | 383 | 375 | 367 | 359 | 351 | 343 | 335 | 327 | 319 | 311 | 303 | 295 | 287 | 279 | 271 | 263 |
|    | CRC | | Header Slot Type |||||||||||||||||
|    |    | | 168 |||||||||||||||||

|    |    | Lanes |||||||||||||||||
|----|----|-----|-----|-----|-----|-----|-----|-----|-----|-----|-----|-----|-----|-----|-----|-----|-----|
|    |    | 31 | 30 | 29 | 28 | 27 | 26 | 25 | 24 | 23 | 22 | 21 | 20 | 19 | 18 | 17 | 16 |
| UI | 1 | 248 | 240 | 232 | 224 | 216 | 208 | 200 | 192 | 184 | 176 | 168 | 160 | 152 | 144 | 136 | 128 |
|    | 2 | 249 | 241 | 233 | 225 | 217 | 209 | 201 | 193 | 185 | 177 | 169 | 161 | 153 | 145 | 137 | 129 |
|    | 3 | 250 | 242 | 234 | 226 | 218 | 210 | 202 | 194 | 186 | 178 | 170 | 162 | 154 | 146 | 138 | 130 |
|    | 4 | 251 | 243 | 235 | 227 | 219 | 211 | 203 | 195 | 187 | 179 | 171 | 163 | 155 | 147 | 139 | 131 |
|    | 5 | 252 | 244 | 236 | 228 | 220 | 212 | 204 | 196 | 188 | 180 | 172 | 164 | 156 | 148 | 140 | 132 |
|    | 6 | 253 | 245 | 237 | 229 | 221 | 213 | 205 | 197 | 189 | 181 | 173 | 165 | 157 | 149 | 141 | 133 |
|    | 7 | 254 | 246 | 238 | 230 | 222 | 214 | 206 | 198 | 190 | 182 | 174 | 166 | 158 | 150 | 142 | 134 |
|    | 8 | 255 | 247 | 239 | 231 | 223 | 215 | 207 | 199 | 191 | 183 | 175 | 167 | 159 | 151 | 143 | 135 |
|    |    | Generic Slot Type ||||||||||||||||
|    |    | 168 ||||||||||||||||

|    |    | Lanes |||||||||||||||||
|----|----|-----|-----|-----|-----|-----|-----|-----|-----|-----|-----|-----|-----|-----|-----|-----|-----|
|    |    | 15 | 14 | 13 | 12 | 11 | 10 | 9 | 8 | 7 | 6 | 5 | 4 | 3 | 2 | 1 | 0 |
| UI | 1 | 120 | 112 | 104 | 96 | 88 | 80 | 72 | 64 | 56 | 48 | 40 | 32 | 24 | 16 | 8 | 0 |
|    | 2 | 121 | 113 | 105 | 97 | 89 | 81 | 73 | 65 | 57 | 49 | 41 | 33 | 25 | 17 | 9 | 1 |
|    | 3 | 122 | 114 | 106 | 98 | 90 | 82 | 74 | 66 | 58 | 50 | 42 | 34 | 26 | 18 | 10 | 2 |
|    | 4 | 123 | 115 | 107 | 99 | 91 | 83 | 75 | 67 | 59 | 51 | 43 | 35 | 27 | 19 | 11 | 3 |
|    | 5 | 124 | 116 | 108 | 100 | 92 | 84 | 76 | 68 | 60 | 52 | 44 | 36 | 28 | 20 | 12 | 4 |
|    | 6 | 125 | 117 | 109 | 101 | 93 | 85 | 77 | 69 | 61 | 53 | 45 | 37 | 29 | 21 | 13 | 5 |
|    | 7 | 126 | 118 | 110 | 102 | 94 | 86 | 78 | 70 | 62 | 54 | 46 | 38 | 30 | 22 | 14 | 6 |
|    | 8 | 127 | 119 | 111 | 103 | 95 | 87 | 79 | 71 | 63 | 55 | 47 | 39 | 31 | 23 | 15 | 7 |
|    |    | Generic Slot Type ||||||||||||||||
|    |    | 168 ||||||||||||||||

*FIG. 14A*

| UI | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 |
|---|---|---|---|---|---|---|---|---|---|---|---|---|---|---|---|---|---|---|---|---|---|---|---|---|---|---|
| 1 | 0 | 0 | 376 | 368 | 360 | 352 | 344 | 336 | 328 | 320 | 312 | 304 | 296 | 288 | 280 | 272 | 264 | 256 | 248 | 240 | 232 | 224 | 216 | 208 | 200 | 192 |
| 2 | 0 | 0 | 377 | 369 | 361 | 353 | 345 | 337 | 329 | 321 | 313 | 305 | 297 | 289 | 281 | 273 | 265 | 257 | 249 | 241 | 233 | 225 | 217 | 209 | 201 | 193 |
| 3 | 0 | 0 | 378 | 370 | 362 | 354 | 346 | 338 | 330 | 322 | 314 | 306 | 298 | 290 | 282 | 274 | 266 | 258 | 250 | 242 | 234 | 226 | 218 | 210 | 202 | 194 |
| 4 | 0 | 0 | 379 | 371 | 363 | 355 | 347 | 339 | 331 | 323 | 315 | 307 | 299 | 291 | 283 | 275 | 267 | 259 | 251 | 243 | 235 | 227 | 219 | 211 | 203 | 195 |
| 5 | 0 | 0 | 380 | 372 | 364 | 356 | 348 | 340 | 332 | 324 | 316 | 308 | 300 | 292 | 284 | 276 | 268 | 260 | 252 | 244 | 236 | 228 | 220 | 212 | 204 | 196 |
| 6 | 0 | 0 | 381 | 373 | 365 | 357 | 349 | 341 | 333 | 325 | 317 | 309 | 301 | 293 | 285 | 277 | 269 | 261 | 253 | 245 | 237 | 229 | 221 | 213 | 205 | 197 |
| 7 | 0 | 0 | 382 | 374 | 366 | 358 | 350 | 342 | 334 | 326 | 318 | 310 | 302 | 294 | 286 | 278 | 270 | 262 | 254 | 246 | 238 | 230 | 222 | 214 | 206 | 198 |
| 8 | 0 | 0 | 383 | 375 | 367 | 359 | 351 | 343 | 335 | 327 | 319 | 311 | 303 | 295 | 287 | 279 | 271 | 263 | 255 | 247 | 239 | 231 | 223 | 215 | 207 | 199 |

Lanes / Packet(s) — NA

| UI | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| 1 | 184 | 176 | 168 | 160 | 152 | 144 | 136 | 128 | 120 | 112 | 104 | 96 | 88 | 80 | 72 | 64 | 56 | 48 | 40 | 32 | 24 | 16 | 8 | 0 |
| 2 | 185 | 177 | 169 | 161 | 153 | 145 | 137 | 129 | 121 | 113 | 105 | 97 | 89 | 81 | 73 | 65 | 57 | 49 | 41 | 33 | 25 | 17 | 9 | 1 |
| 3 | 186 | 178 | 170 | 162 | 154 | 146 | 138 | 130 | 122 | 114 | 106 | 98 | 90 | 82 | 74 | 66 | 58 | 50 | 42 | 34 | 26 | 18 | 10 | 2 |
| 4 | 187 | 179 | 171 | 163 | 155 | 147 | 139 | 131 | 123 | 115 | 107 | 99 | 91 | 83 | 75 | 67 | 59 | 51 | 43 | 35 | 27 | 19 | 11 | 3 |
| 5 | 188 | 180 | 172 | 164 | 156 | 148 | 140 | 132 | 124 | 116 | 108 | 100 | 92 | 84 | 76 | 68 | 60 | 52 | 44 | 36 | 28 | 20 | 12 | 4 |
| 6 | 189 | 181 | 173 | 165 | 157 | 149 | 141 | 133 | 125 | 117 | 109 | 101 | 93 | 85 | 77 | 69 | 61 | 53 | 45 | 37 | 29 | 21 | 13 | 5 |
| 7 | 190 | 182 | 174 | 166 | 158 | 150 | 142 | 134 | 126 | 118 | 110 | 102 | 94 | 86 | 78 | 70 | 62 | 54 | 46 | 38 | 30 | 22 | 14 | 6 |
| 8 | 191 | 183 | 175 | 167 | 159 | 151 | 143 | 135 | 127 | 119 | 111 | 103 | 95 | 87 | 79 | 71 | 63 | 55 | 47 | 39 | 31 | 23 | 15 | 7 |

| UI | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | Lanes |
|---|---|---|---|---|---|---|---|---|---|---|---|---|---|---|---|---|---|---|---|---|---|---|---|---|---|---|---|
| 1 | 0 | 0 | 376 | 368 | 360 | 352 | 344 | 336 | 328 | 320 | 312 | 304 | 296 | 288 | 280 | 272 | 264 | 256 | 248 | 240 | 232 | 224 | 216 | 208 | 200 | 192 | |
| 2 | 0 | 0 | 377 | 369 | 361 | 353 | 345 | 337 | 329 | 321 | 313 | 305 | 297 | 289 | 281 | 273 | 265 | 257 | 249 | 241 | 233 | 225 | 217 | 209 | 201 | 193 | |
| 3 | 0 | 0 | 378 | 370 | 362 | 354 | 346 | 338 | 330 | 322 | 314 | 306 | 298 | 290 | 282 | 274 | 266 | 258 | 250 | 242 | 234 | 226 | 218 | 210 | 202 | 194 | |
| 4 | 0 | 0 | 379 | 371 | 363 | 355 | 347 | 339 | 331 | 323 | 315 | 307 | 299 | 291 | 283 | 275 | 267 | 259 | 251 | 243 | 235 | 227 | 219 | 211 | 203 | 195 | |
| 5 | 0 | 0 | 380 | 372 | 364 | 356 | 348 | 340 | 332 | 324 | 316 | 308 | 300 | 292 | 284 | 276 | 268 | 260 | 252 | 244 | 236 | 228 | 220 | 212 | 204 | 196 | |
| 6 | 0 | 0 | 381 | 373 | 365 | 357 | 349 | 341 | 333 | 325 | 317 | 309 | 301 | 293 | 285 | 277 | 269 | 261 | 253 | 245 | 237 | 229 | 221 | 213 | 205 | 197 | |
| 7 | 0 | 0 | 382 | 374 | 366 | 358 | 350 | 342 | 334 | 326 | 318 | 310 | 302 | 294 | 286 | 278 | 270 | 262 | 254 | 246 | 238 | 230 | 222 | 214 | 206 | 198 | |
| 8 | 0 | 0 | 383 | 375 | 367 | 359 | 351 | 343 | 335 | 327 | 319 | 311 | 303 | 295 | 287 | 279 | 271 | 263 | 255 | 247 | 239 | 231 | 223 | 215 | 207 | 199 | |
| | NA | | LLP1 | LLP2 | LLP2 | LLP1 | LLP1 | LLP2 | LLP2 | LLP1 | LLP1 | LLP2 | LLP2 | LLP1 | LLP1 | LLP2 | LLP2 | LLP1 | LLP1 | LLP2 | LLP2 | LLP1 | LLP1 | LLP2 | LLP2 | LLP1 | |

| UI | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | Lanes |
|---|---|---|---|---|---|---|---|---|---|---|---|---|---|---|---|---|---|---|---|---|---|---|---|---|---|
| 1 | 184 | 176 | 168 | 160 | 152 | 144 | 136 | 128 | 120 | 112 | 104 | 96 | 88 | 80 | 72 | 64 | 56 | 48 | 40 | 32 | 24 | 16 | 8 | 0 | |
| 2 | 185 | 177 | 169 | 161 | 153 | 145 | 137 | 129 | 121 | 113 | 105 | 97 | 89 | 81 | 73 | 65 | 57 | 49 | 41 | 33 | 25 | 17 | 9 | 1 | |
| 3 | 186 | 178 | 170 | 162 | 154 | 146 | 138 | 130 | 122 | 114 | 106 | 98 | 90 | 82 | 74 | 66 | 58 | 50 | 42 | 34 | 26 | 18 | 10 | 2 | |
| 4 | 187 | 179 | 171 | 163 | 155 | 147 | 139 | 131 | 123 | 115 | 107 | 99 | 91 | 83 | 75 | 67 | 59 | 51 | 43 | 35 | 27 | 19 | 11 | 3 | |
| 5 | 188 | 180 | 172 | 164 | 156 | 148 | 140 | 132 | 124 | 116 | 108 | 100 | 92 | 84 | 76 | 68 | 60 | 52 | 44 | 36 | 28 | 20 | 12 | 4 | |
| 6 | 189 | 181 | 173 | 165 | 157 | 149 | 141 | 133 | 125 | 117 | 109 | 101 | 93 | 85 | 77 | 69 | 61 | 53 | 45 | 37 | 29 | 21 | 13 | 5 | |
| 7 | 190 | 182 | 174 | 166 | 158 | 150 | 142 | 134 | 126 | 118 | 110 | 102 | 94 | 86 | 78 | 70 | 62 | 54 | 46 | 38 | 30 | 22 | 14 | 6 | |
| 8 | 191 | 183 | 175 | 167 | 159 | 151 | 143 | 135 | 127 | 119 | 111 | 103 | 95 | 87 | 79 | 71 | 63 | 55 | 47 | 39 | 31 | 23 | 15 | 7 | |
| | LLP1 | LLP1 | LLP1 | LLP1 | LLP1 | LLP1 | LLP1 | LLP0 | LLP0 | LLP0 | LLP0 | LLP0 | LLP0 | LLP0 | LLP0 | LLP0 | LLP0 | LLP0 | LLP0 | LLP0 | LLP0 | LLP0 | LLP0 | LLP0 | |

MULTICHIP PACKAGE LINK

CROSS-REFERENCE TO RELATED APPLICATIONS

This Application is a continuation of U.S. patent application Ser. No. 15/039,4552 filed May 26, 2016 and entitled "Multichip Package Link" which is a national stage application under 35 U.S.C. § 371 of PCT Application PCT/US2013/077744, filed on Dec. 26, 2013 and entitled "Multichip Package Link", which is incorporated by reference in its entirety. The disclosures of the prior application is considered part of and is hereby incorporated by reference in its entirety in the disclosure of this application.

FIELD

This disclosure pertains to computing system, and in particular (but not exclusively) to point-to-point interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 14A-14C are example bit mappings of data on lanes of an example MCPL.

Like reference numbers and designations in the various drawings indicate like elements.

DETAILED DESCRIPTION

Figure 1:
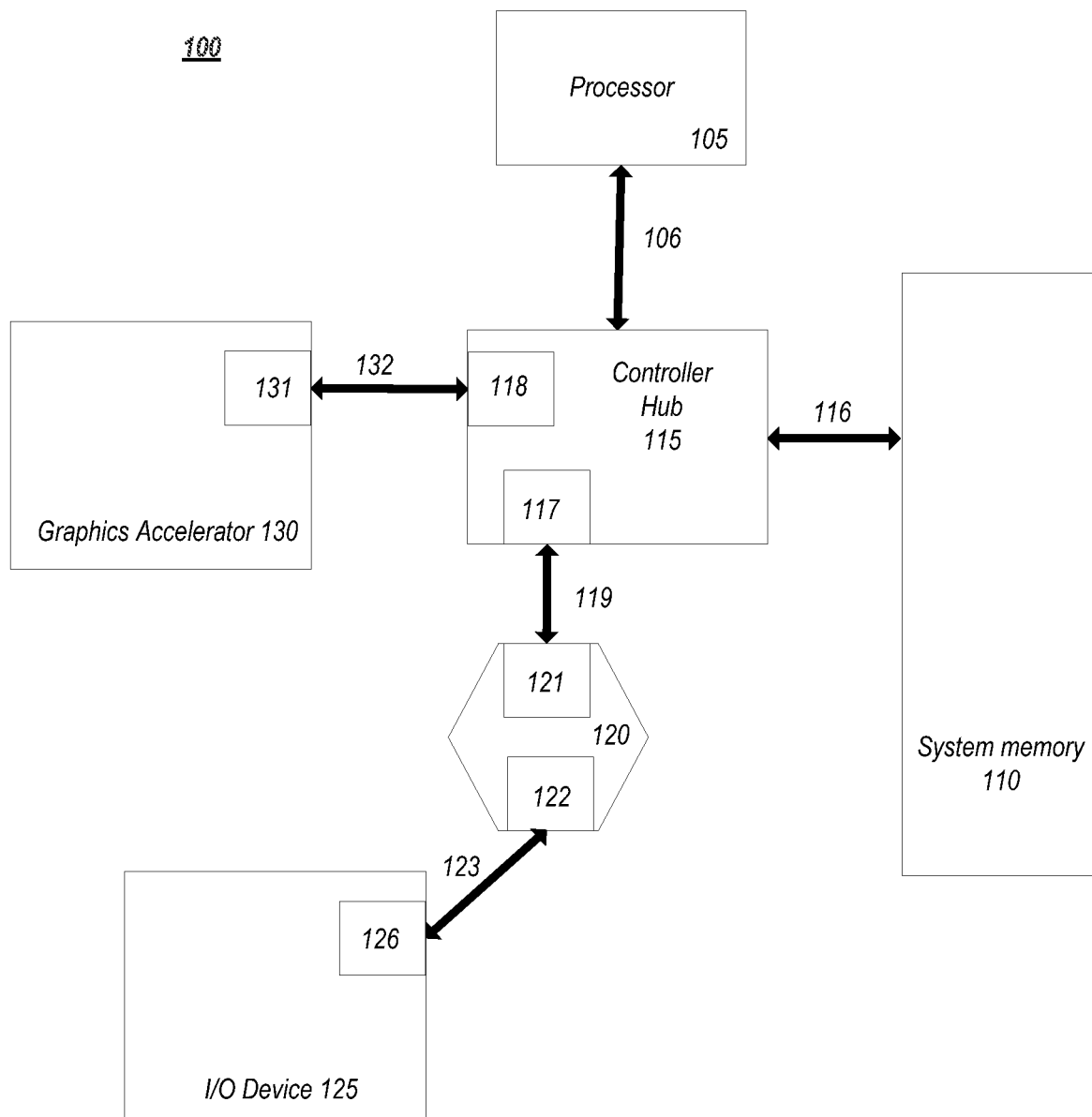
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCT-to-PCT bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
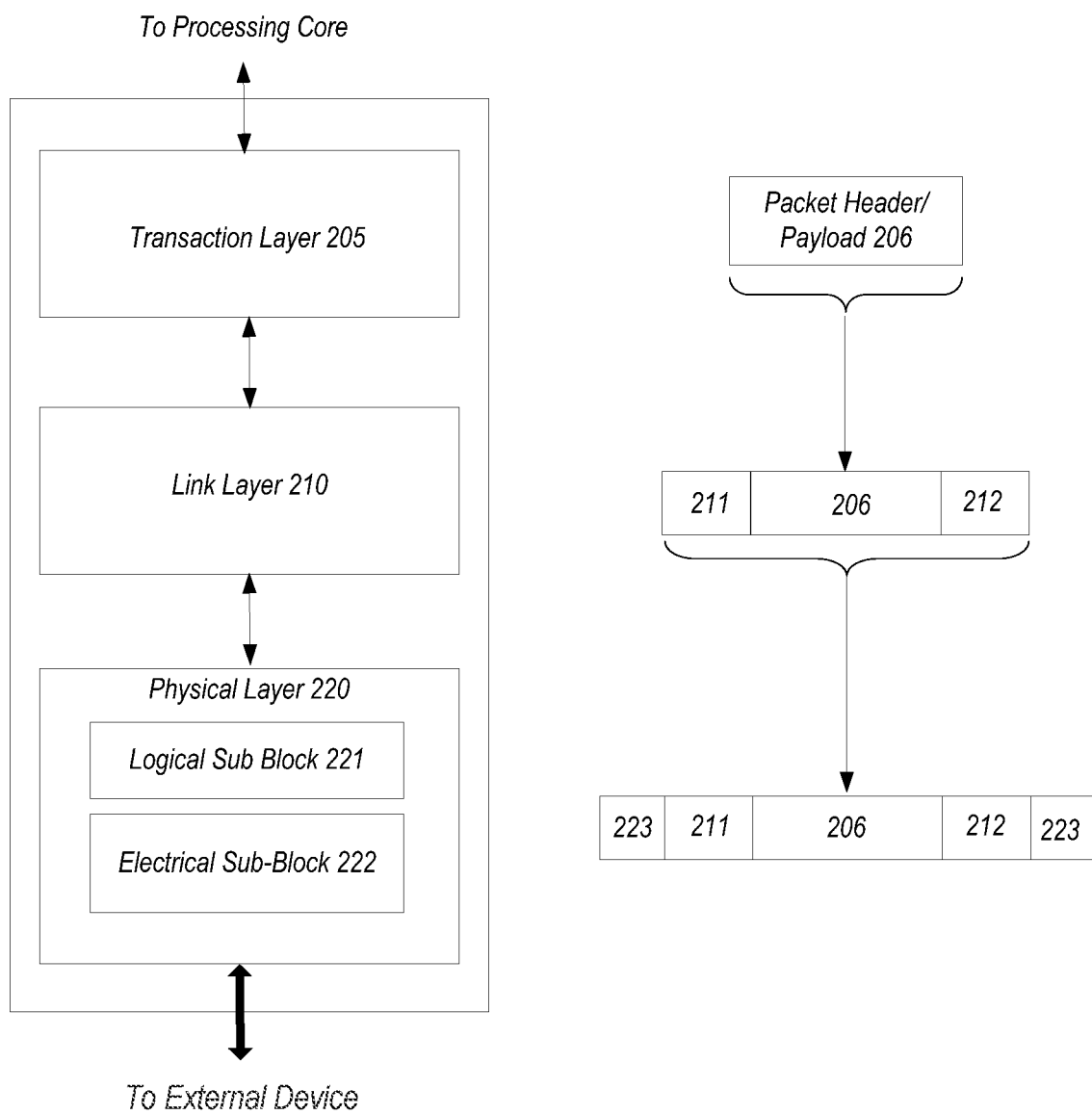
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
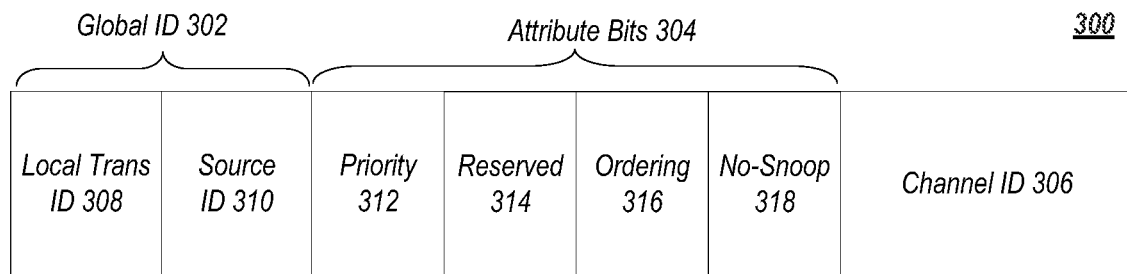
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
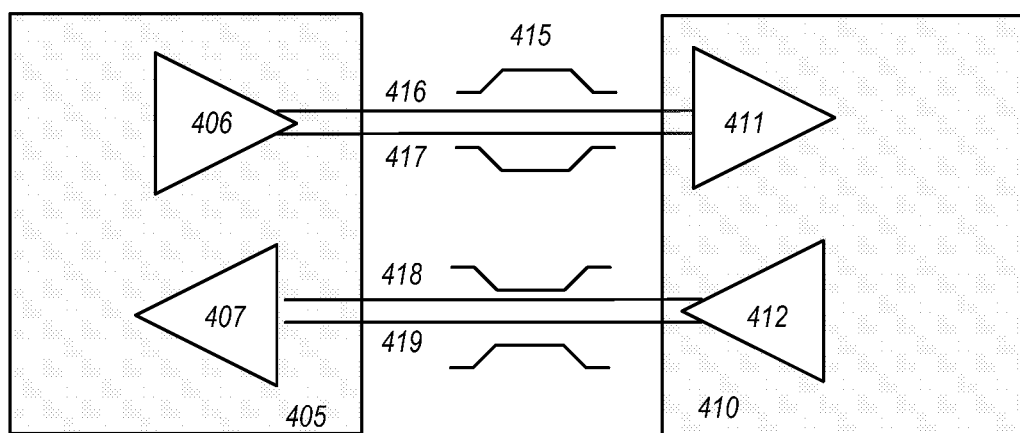
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 5:
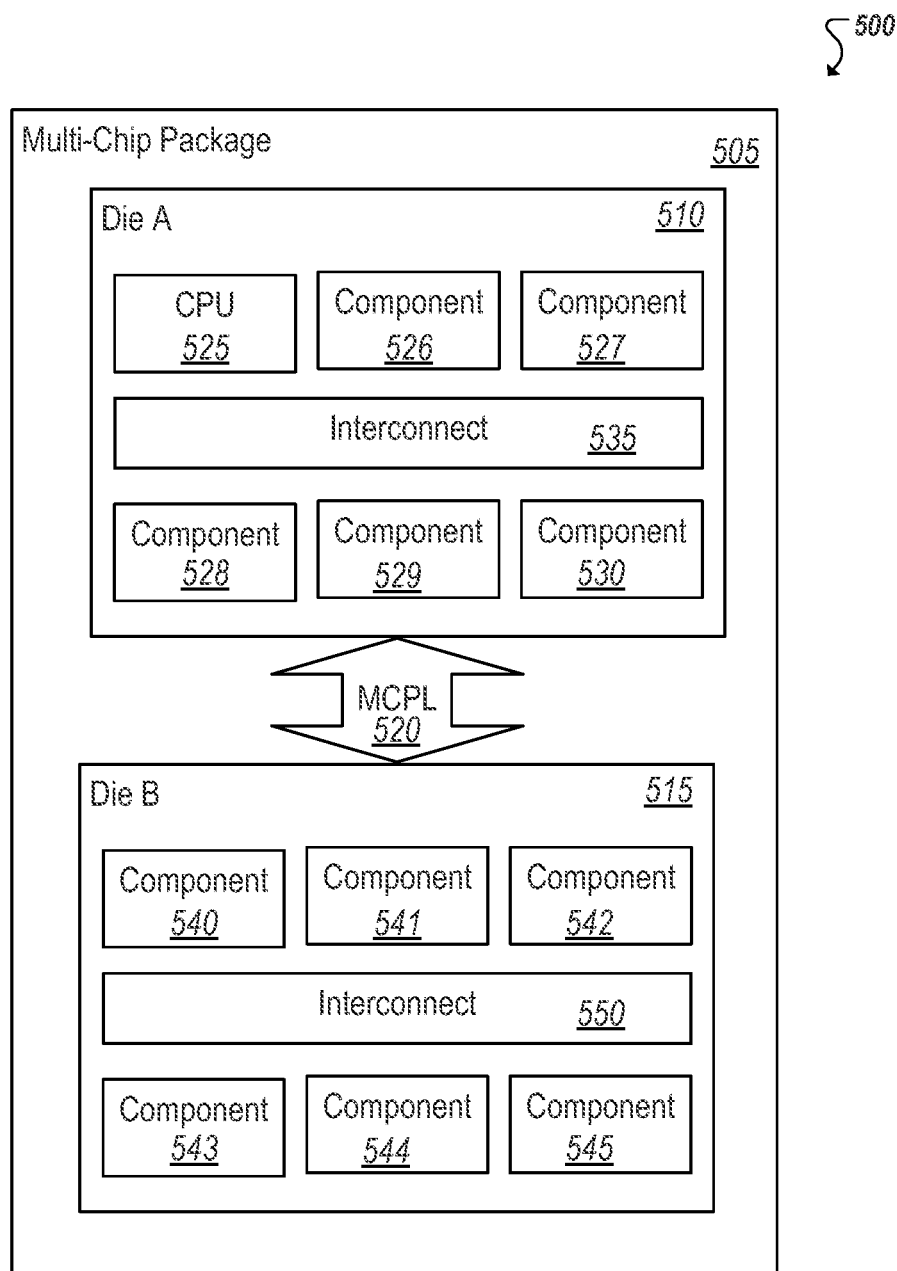
FIG. 5 illustrates an embodiment of a multichip package.

FIG. 5 is a simplified block diagram 500 illustrating an example multi-chip package 505 that includes two or more chips, or dies, (e.g., 510, 515) communicatively connected using an example multi-chip package link (MCPL) 520. While FIG. 5 illustrates an example of two (or more) dies that are interconnected using an example MCPL 520, it should be appreciated that the principles and features described herein regarding implementations of an MCPL can be applied to any interconnect or link connecting a die (e.g., 510) and other components, including connecting two or more dies (e.g., 510, 515), connecting a die (or chip) to another component off-die, connecting a die to another device or die off-package (e.g., 505), connecting die to a BGA package, implementation of a Patch on Interposer (POINT), among potentially other examples.

Generally, a multichip package (e.g., 505) can be an electronic package where multiple integrated circuits (ICs), semiconductor dies or other discrete components (e.g., 510, 515) are packaged onto a unifying substrate (e.g., silicon or other semiconductor substrate), facilitating the combined components' use as a single component (e.g., as though a larger IC). In some instances, the larger components (e.g., dies 510, 515) can themselves be IC systems, such as systems on chip (SoC), multiprocessor chips, or other components that include multiple components (e.g., 525-530 and 540-545) on the device, for instance, on a single die (e.g., 510, 515). Multichip packages 505 can provide flexibility for building complex and varied systems from potentially multiple discrete components and systems. For instance, each of dies 510, 515 may be manufactured or otherwise provided by two different entities, with the silicon substrate of the package 505 provided by yet a third entity, among many other examples. Further, dies and other components within a multichip package 505 can themselves include interconnect or other communication fabrics (e.g., 535, 550) providing the infrastructure for communication between components (e.g., 525-530 and 540-545) within the device (e.g., 510, 515 respectively). The various components and interconnects (e.g., 535, 550) may potentially support or use multiple different protocols. Further, communication between dies (e.g., 510, 515) can potentially include transactions between the various components on the dies over multiple different protocols. Designing mechanisms to provide communication between chips (or dies) on a multichip package can be challenging, with traditional solutions employing highly specialized, expensive, and package-specific solutions based on the specific combinations of components (and desired transactions) sought to be interconnected.

The examples, systems, algorithms, apparatus, logic, and features described within this Specification can address at least some of the issues identified above, including potentially many others not explicitly mentioned herein. For instance, in some implementations, a high bandwidth, low power, low latency interface can be provided to connect a host device (e.g., a CPU) or other device to a companion chip that sits in the same package as the host. Such a multichip package link (MCPL) can support multiple package options, multiple I/O protocols, as well as Reliability, Availability, and Serviceability (RAS) features. Further, the physical layer (PHY) can include an electrical layer and logic layer and can support longer channel lengths, including channel lengths up to, and in some cases exceeding, approximately 45 mm. In some implementations, an example MCPL can operate at high data rates, including data rates exceeding 8-10 Gb/s.

In one example implementation of an MCPL, a PHY electrical layer can improve upon traditional multi-channel interconnect solutions (e.g., multi-channel DRAM I/O), extending the data rate and channel configuration, for instance, by a number of features including, as examples, regulated mid-rail termination, low power active crosstalk cancellation, circuit redundancy, per bit duty cycle correction and deskew, line coding, and transmitter equalization, among potentially other examples.

In one example implementation of an MCPL, a PHY logical layer can be implemented that can further assist (e.g., electrical layer features) in extending the data rate and channel configuration while also enabling the interconnect to route multiple protocols across the electrical layer. Such implementations can provide and define a modular common physical layer that is protocol agnostic and architected to work with potentially any existing or future interconnect protocol.

Figure 6:
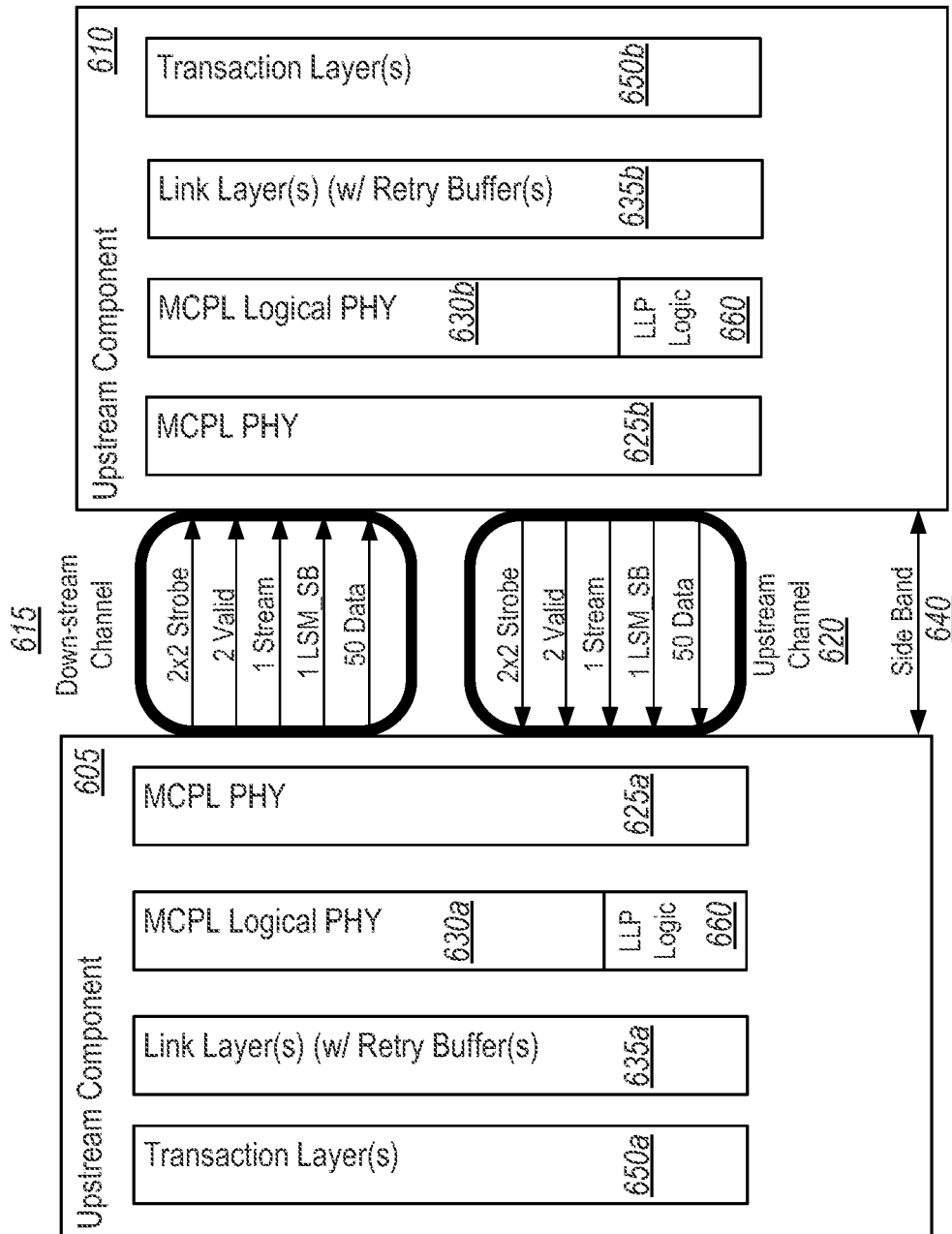
FIG. 6 is a simplified block diagram of a multichip package link (MCPL).

Turning to FIG. 6, a simplified block diagram 600 is shown representing at least a portion of a system including an example implementation of a multichip package link (MCPL). An MCPL can be implemented using physical electrical connections (e.g., wires implemented as lanes) connecting a first device 605 (e.g., a first die including one or more sub-components) with a second device 610 (e.g., a second die including one or more other sub-components). In the particular example shown in the high-level representation of diagram 600, all signals (in channels 615, 620) can be unidirectional and lanes can be provided for the data signals to have both an upstream and downstream data transfer. While the block diagram 600 of FIG. 6, refers to the first component 605 as the upstream component and the second component 610 as the downstream components, and physical lanes of the MCPL used in sending data as a downstream channel 615 and lanes used for receiving data (from component 610) as an upstream channel 620, it should be appreciated that the MCPL between devices 605, 610 can be used by each device to both send and receive data between the devices.

In one example implementation, an MCPL can provide a physical layer (PHY) including the electrical MCPL PHY 625a,b (or, collectively, 625) and executable logic implementing MCPL logical PHY 630a,b (or, collectively, 630). Electrical, or physical, PHY 625 can provide the physical connection over which data is communicated between devices 605, 610. Signal conditioning components and logic can be implemented in connection with the physical PHY 625 in order to establish high data rate and channel configuration capabilities of the link, which in some applications can involve tightly clustered physical connections at lengths of approximately 45 mm or more. The logical PHY 630 can include logic for facilitating clocking, link state management (e.g., for link layers 635a, 635b), and protocol multiplexing between potentially multiple, different protocols used for communications over the MCPL.

In one example implementation, physical PHY 625 can include, for each channel (e.g., 615, 620) a set of data lanes, over which in-band data can be sent. In this particular example, 50 data lanes are provided in each of the upstream and downstream channels 615, 620, although any other number of lanes can be used as permitted by the layout and power constraints, desired applications, device constraints, etc. Each channel can further include one or more dedicated lanes for a strobe, or clock, signal for the channel, one or more dedicated lanes for a valid signal for the channel, one or more dedicated lanes for a stream signal, and one or more dedicated lanes for a link state machine management or sideband signal. The physical PHY can further include a sideband link 640, which, in some examples, can be a bi-directional lower frequency control signal link used to coordinate state transitions and other attributes of the MCPL connecting devices 605, 610, among other examples.

As noted above, multiple protocols can be supported using an implementation of MCPL. Indeed, multiple, independent transaction layers 650a, 650b can be provided at each device 605, 610. For instance, each device 605, 610 may support and utilize two or more protocols, such as PCI, PCIe, QPI, Intel In-Die Interconnect (IDI), among others. IDI is a coherent protocol used on-die to communicate between cores, Last Level Caches (LLCs), memory, graphics, and IO controllers. Other protocols can also be supported including Ethernet protocol, Infiniband protocols, and other PCIe fabric based protocols. The combination of the Logical PHY and physical PHY can also be used as a die-to-die interconnect to connect a SerDes PHY (PCIe, Ethernet, Infiniband or other high speed SerDes) on one Die to its upper layers that are implemented on the other die, among other examples.

Logical PHY 630 can support multiplexing between these multiple protocols on an MCPL. For instance, the dedicated stream lane can be used to assert an encoded stream signal that identifies which protocol is to apply to data sent substantially concurrently on the data lanes of the channel. Further, logical PHY 630 can be used to negotiate the various types of link state transitions that the various protocols may support or request. In some instances, LSM_SB signals sent over the channel's dedicated LSM_SB lane can be used, together with side band link 640 to communicate and negotiate link state transitions between the devices 605, 610. Further, link training, error detection, skew detection, de-skewing, and other functionality of traditional interconnects can be replaced or governed, in part using logical PHY 630. For instance, valid signals sent over one or more dedicated valid signal lanes in each channel can be used to signal link activity, detect skew, link errors, and realize other features, among other examples. In the particular example of FIG. 6, multiple valid lanes are provided per channel. For instance, data lanes within a channel can be bundled or clustered (physically and/or logically) and a valid lane can be provided for each cluster. Further, multiple strobe lanes can be provided, in some cases, also to provide a dedicated strobe signal for each cluster in a plurality of data lane clusters in a channel, among other examples.

As noted above, logical PHY 630 can be used to negotiate and manage link control signals sent between devices connected by the MCPL. In some implementations, logical PHY 630 can include link layer packet (LLP) generation logic 660 that can be used to send link layer control messages over the MCPL (i.e., in band). Such messages can be sent over data lanes of the channel, with the stream lane identifying that the data is link layer-to-link layer messaging, such as link layer control data, among other examples. Link layer messages enabled using LLP module 660 can assist in the negotiation and performance of link layer state transitioning, power management, loopback, disable, re-centering, scrambling, among other link layer features between the link layers 635a, 635b of devices 605, 610 respectively.

Figure 7:
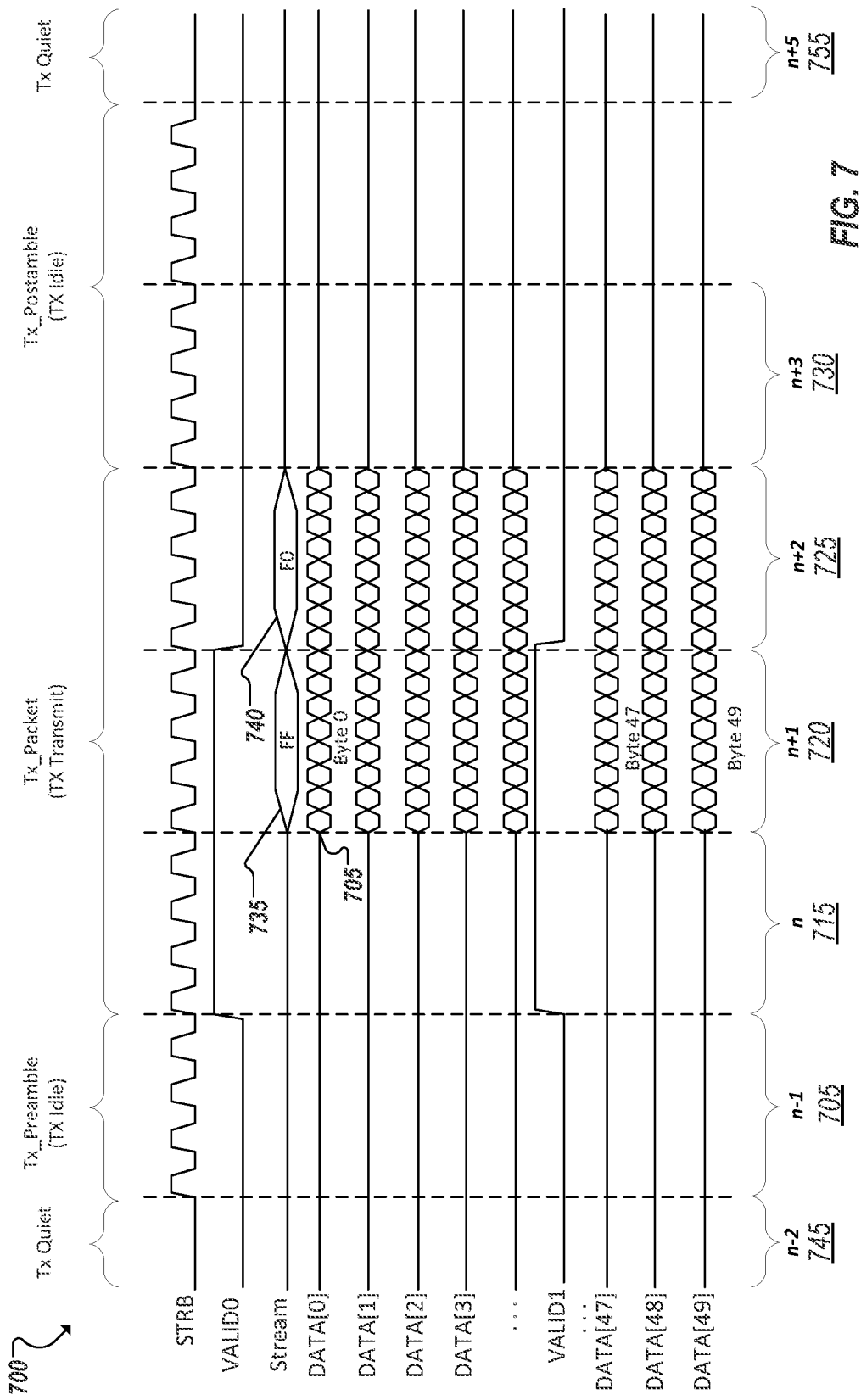
FIG. 7 is a representation of example signaling on an example MCPL.

Turning to FIG. 7, a diagram 700 is shown representing example signaling using a set of lanes (e.g., 615, 620) in a particular channel of an example MCPL. In the example of FIG. 7, two clusters of twenty-five (25) data lanes are provided for fifty (50) total data lanes in the channel. A portion of the lanes are shown, while others (e.g., DATA[4-46] and a second strobe signal lane (STRB)) are omitted (e.g., as redundant signals) for convenience in illustrating the particular example. When the physical layer is in an active state (e.g., not powered off or in a low power mode (e.g., an L1 state)), strobe lanes (STRB) can be provided with a synchronous clock signal. In some implementations, data can be sent on both the rising and falling edges of the strobe. Each edge (or half clock cycle) can demarcate a unit interval (UI). Accordingly, in this example, a bit (e.g., 705) can be sent on each lane, allowing for a byte to be sent every 8UI. A byte time period 710 can be defined as 8UI, or the time for sending a byte on a single one of the data lanes (e.g., DATA[0-49]).

In some implementations, a valid signal, sent on one or more dedicated valid signal channels (e.g., VALID0, VALID1), can serve as a leading indicator for the receiving device to identify, when asserted (high), to the receiving device, or sink, that data is being sent from the sending device, or source, on data lanes (e.g., DATA[0-49]) during the following time period, such as a byte time period 710. Alternatively, when the valid signal is low, the source indicates to the sink that the sink will not be sending data on the data lanes during the following time period. Accordingly, when the sink logical PHY detects that the valid signal is not asserted (e.g., on lanes VALID0 and VALID1), the sink can disregard any data that is detected on the data lanes (e.g., DATA[0-49]) during the following time period. For instance, cross talk noise or other bits may appear on one or more of the data lanes when the source, in fact, is not sending any data. By virtue of a low, or non-asserted, valid signal during the previous time period (e.g., the previous byte time period), the sink can determine that the data lanes are to be disregarded during the following time period.

Data sent on each of the lanes of the MCPL can be strictly aligned to the strobe signal. A time period can be defined based on the strobe, such as a byte time period, and each of these periods can correspond to a defined window in which signals are to be sent on the data lanes (e.g., DATA[0-49]), the valid lanes (e.g., VALID1, VALID2), and stream lane (e.g., STREAM). Accordingly, alignment of these signals can enable identification that a valid signal in a previous time period window applies to data in the following time period window, and that a stream signal applies to data in the same time period window. The stream signal can be an encoded signal (e.g., 1 byte of data for a byte time period window), that is encoded to identify the protocol that applies to data being sent during the same time period window.

To illustrate, in the particular example of FIG. 7, a byte time period window is defined. A valid is asserted at a time period window n (715), before any data is injected on data lanes DATA[0-49]. At the following time period window n+1 (720) data is sent on at least some of the data lanes. In this case, data is sent on all fifty data lanes during n+1 (720). Because a valid was asserted for the duration of the preceding time period window n (715), the sink device can validate the data received on data lanes DATA[0-49] during time period window n+1 (720). Additionally, the leading nature of the valid signal during time period window n (715) allows the receiving device to prepare for the incoming data. Continuing with the example of FIG. 7, the valid signal remains asserted (on VALID1 and VALID2) during the duration of time period window n+1 (720), causing the sink device to expect the data sent over data lanes DATA[0-49] during time period window n+2 (725). If the valid signal were to remain asserted during time period window n+2 (725), the sink device could further expect to receive (and process) additional data sent during an immediately subsequent time period window n+3 (730). In the example of FIG. 7, however, the valid signal is de-asserted during the duration of time period window n+2 (725), indicating to the sink device that no data will be sent during time period window n+3 (730) and that any bits detected on data lanes DATA [0-49] should be disregarded during time period window n+3 (730).

As noted above, multiple valid lanes and strobe lanes can be maintained per channel. This can assist, among other advantages, with maintaining circuit simplicity and synchronization amid the clusters of relatively lengthy physical lanes connecting the two devices. In some implementations, a set of data lanes can be divided into clusters of data lanes. For instance, in the example of FIG. 7, data lanes DATA[0-49] can be divided into two twenty-five lane clusters and each cluster can have a dedicated valid and strobe lane. For instance, valid lane VALID1 can be associated with data lanes DATA[0-24] and valid lane VALID2 can be associated with data lanes DATA[25-49]. The signals on each "copy" of the valid and strobe lanes for each cluster can be identical.

As introduced above, data on stream lane STREAM can be used to indicate to the receiving logical PHY what protocol is to apply to corresponding data being sent on data lanes data lanes DATA[0-49]. In the example of FIG. 7, a stream signal is sent on STREAM during the same time period window as data on data lanes DATA[0-49] to indicate the protocol of the data on the data lanes. In alternative implementations, the stream signal can be sent during a preceding time period window, such as with corresponding valid signals, among other potential modifications. However, continuing with the example of FIG. 7, a stream signal 735 is sent during time period window n+1 (720) that is encoded to indicate the protocol (e.g., PCIe, PCI, IDI, QPI, etc.) that is to apply to the bits sent over data lanes DATA[0-49] during time period window n+1 (720). Similarly, another stream signal 740 can be sent during the subsequent time period window n+2 (725) to indicate the protocol that applies to the bits sent over data lanes DATA [0-49] during time period window n+2 (725), and so on. In some cases, such as the example of FIG. 7 (where both stream signals 735, 740 have the same encoding, binary FF), data in sequential time period windows (e.g., n+1 (720) and n+2 (725)) can belong to the same protocol. However, in other cases, data in sequential time period windows (e.g., n+1 (720) and n+2 (725)) can be from different transactions to which different protocols are to apply, and stream signals (e.g., 735, 740) can be encoded accordingly to identify the different protocols applying to the sequential bytes of data on the data lanes (e.g., DATA[0-49]), among other examples.

In some implementations, a low power or idle state can be defined for the MCPL. For instance, when neither device on the MCPL is sending data, the physical layer (electrical and logical) of MCPL can go to an idle or low power state. For instance, in the example of FIG. 7, at time period window n−2 (745), the MCPL is in a quiet or idle state and the strobe is disabled to save power. The MCPL can transition out of low-power or idle mode, awaking the strobe at time period window time period window n−1 (e.g., 705). The strobe can complete a transmission preamble (e.g., to assist in waking and synchronizing each of the lanes of the channel, as well as the sink device), beginning the strobe signal prior to any other signaling on the other non-strobe lanes. Following this time period window n−1 (705), the valid signal can be asserted at time period window n (715) to notify the sink that data is forthcoming in the following time period window n+1 (720), as discussed above.

The MCPL may re-enter a low power or idle state (e.g., an L1 state) following the detection of idle conditions on the valid lanes, data lanes, and/or other lanes of the MCPL channel. For instance, no signaling may be detected beginning at time period window n+3 (730) and going forward. Logic on either the source or sink device can initiate transition back into a low power state leading again (e.g., time period window n+5 (755)) to the strobe going idle in a power savings mode, among other examples and principles (including those discussed later herein).

Electrical characteristics of the physical PHY can include one or more of single-ended signaling, half-rate forwarded clocking, matching of interconnect channel as well as on-chip transport delay of transmitter (source) and receiver (sink), optimized electrostatic discharge (ESD) protection, pad capacitance, among other features. Further, an MCPL can be implemented to achieve higher data rate (e.g., approaching 16 Gb/s) and energy efficiency characteristics than traditional package I/O solutions.

Figure 8:
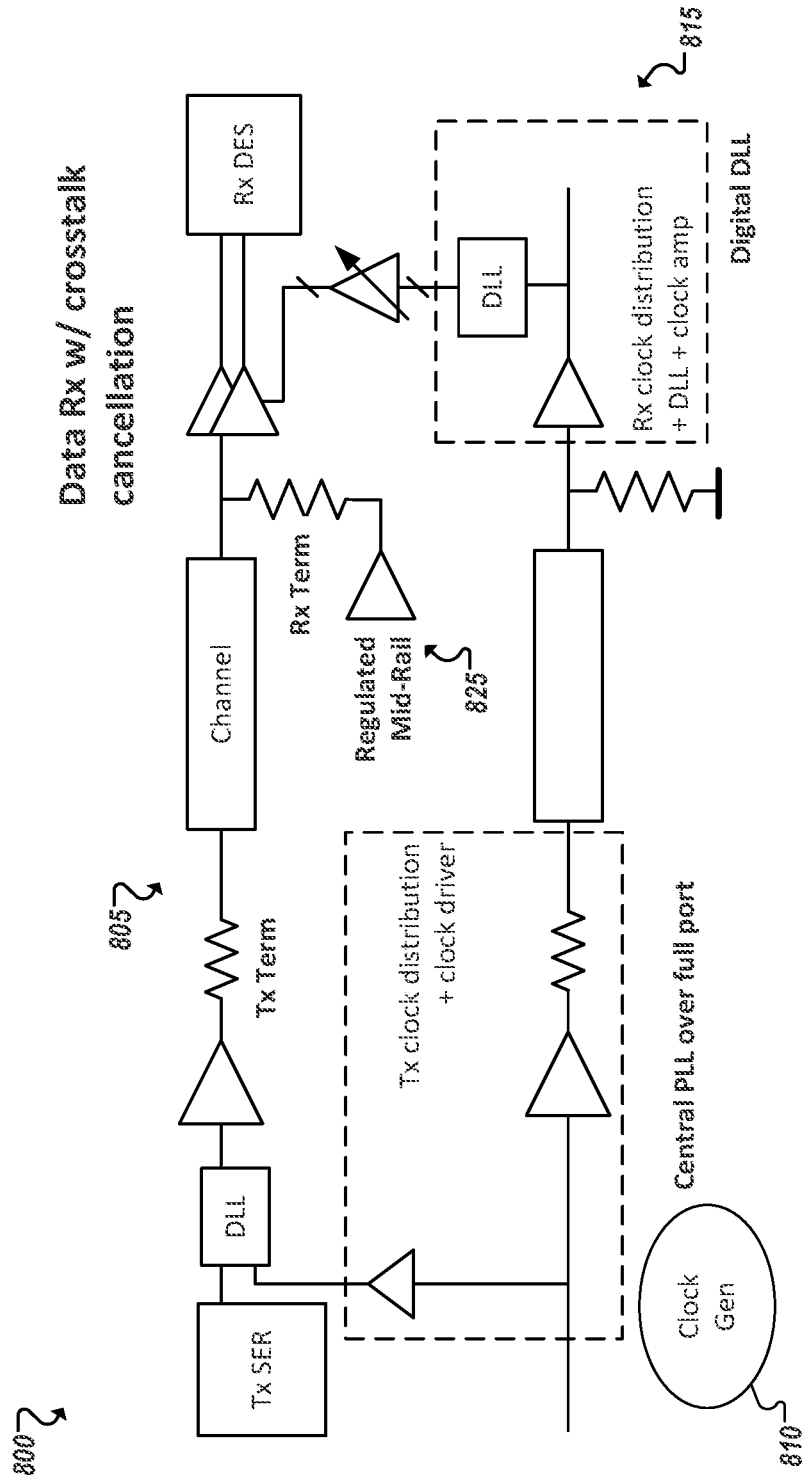
FIG. 8 is a simplified block diagram illustrating a data lane in an example MCPL.

FIG. 8 illustrates a portion of a simplified block diagram 800 representing a portion of an example MCPL. The diagram 800 of FIG. 8 includes a representation of an example lane 805 (e.g., a data lane, valid lane, or stream lane) and clock generation logic 810. As shown in the example of FIG. 8, in some implementations, clock generation logic 810 can be implemented as a clock tree to distribute the generated clock signal to each block implementing each lane of the example MCPL, such as data lane 805. Further, a clock recovery circuit 815 can be provided. In some implementations, rather than providing a separate clock recovery circuit for each lane in which the clock signal is distributed, as is customary in at least some traditional interconnect I/O architectures, a single clock recovery circuit can be provided for a cluster of a plurality of lanes. Indeed, as applied to the example configurations in FIGS. 6 and 7, a separate strobe lane and accompanying clock recovery circuit can be provided for each cluster of twenty-five data lanes.

Continuing with the example of FIG. 8, in some implementations, at least the data lanes, stream lanes, and valid lanes can be terminated, mid-rail, to a regulated voltage greater than zero (ground). In some implementations, a mid-rail voltage can be regulated to Vcc/2. In some implementations, a single voltage regulator 825 can be provided per cluster of lanes. For instance, when applied to the examples of FIGS. 6 and 7, a first voltage regulator can be provided for a first cluster of twenty-five data lanes and a second voltage regulator can be provided for the remaining cluster of twenty-five data lanes, among other potential examples. In some instances, an example voltage regulator 825 can be implemented as a linear regulator, a switched capacitor circuit, among other examples. In some implementations, the linear regulator can be provided with analog feedback loop or digital feedback loop, among other examples.

In some implementations, crosstalk cancellation circuitry can also be provided for an example MCPL. In some instances, the compact nature of the long MCPL wires can introduce crosstalk interference between lanes. Crosstalk cancellation logic can be implemented to address these and other issues. For instance, in one example illustrated in FIGS. 9-10, crosstalk can be reduced significantly with an example low power active circuit, such as illustrated in diagrams 900 and 1000. For instance, in the example of FIG. 9, a weighted high-pass filtered "aggressor" signal can be added to the "victim" signal (i.e., the signal suffering crosstalk interference from the aggressor). Each signal can be considered a victim of crosstalk from each other signal in the link, and can, itself, be the aggressor to the other signal insofar it is the source of crosstalk interference. Such a signal can be generated and reduce crosstalk on the victim lane by more than 50%, owing to the derivative nature of crosstalk on the link. The low pass filtered aggressor signal, in the example of FIG. 9, can be generated through a high-pass RC filter (e.g., implemented through C and RI) that produces the filtered signal to be added using a summing circuit 905 (e.g., RX sense-amp).

Figure 9:
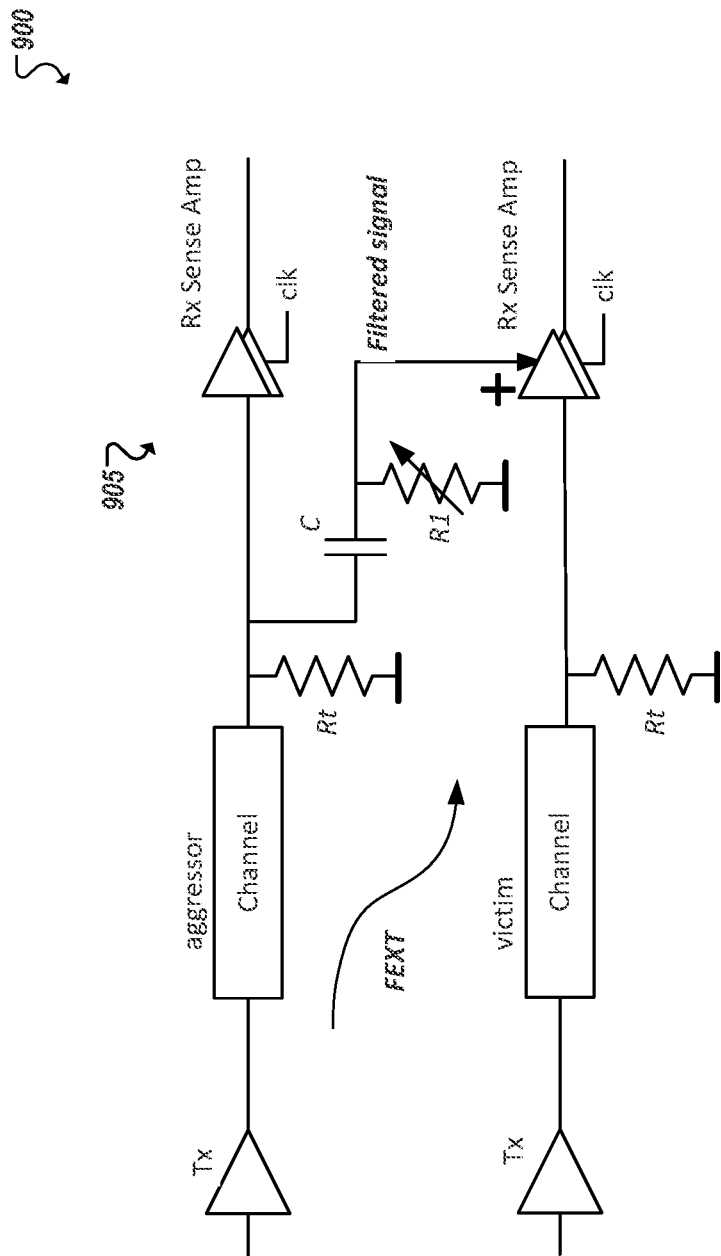
FIG. 9 is a simplified block diagram illustrating example crosstalk cancellation techniques in an embodiment of an MCPL.
Figure 10:
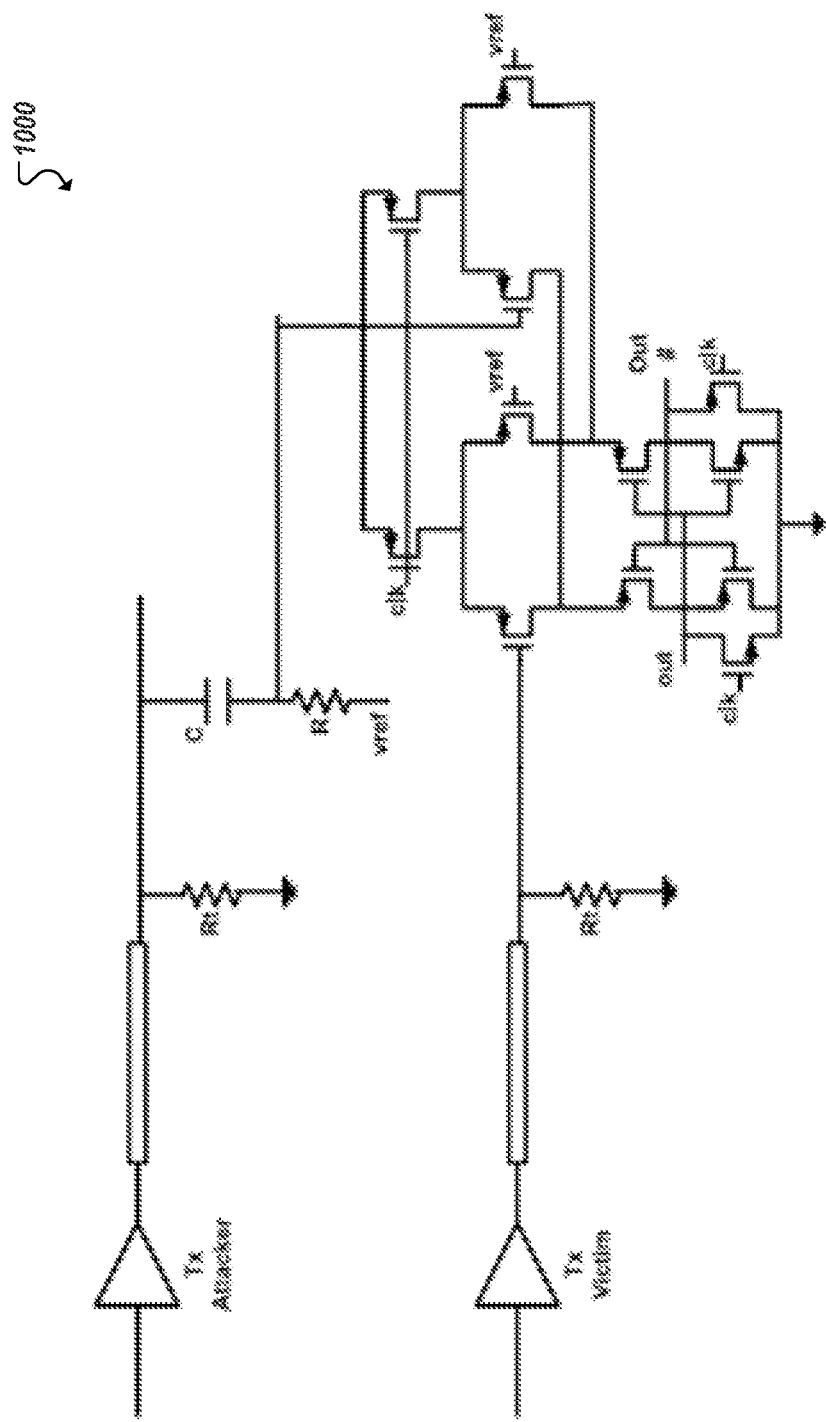
FIG. 10 is a simplified circuit diagram illustrating example crosstalk cancellation components in an embodiment of an MCPL.

Implementations similar to that described in the example of FIG. 9 can be particularly convenient solutions for an application such as MCLP, as implementation of the circuit can be realized with relatively low overhead, as illustrated in the diagram of FIG. 10 illustrating an example transistor-level schematic of the circuit shown and described in the example of FIG. 9. It should be appreciated that the representations in FIGS. 9 and 10 are simplified representations, and an actual implementation would include multiple copies of the circuits illustrated in FIGS. 9 and 10 to accommodate the network of crosstalk interference among and between the lanes of a link. As an example, in a three lane link (e.g., Lanes 0-2) circuitry similar to that described in the examples of FIGS. 9 and 10 could be provided from Lane 0 to Lane 1, from Lane 0 to Lane 2, from Lane 1 to Lane 0, from Lane 1 to Lane 2, from Lane 2 to Lane 0, from Lane 2 to Lane 1, etc. based on the geometry and the layout of the lanes, among other examples Additional features can be implemented at the physical PHY level of an example MCPL. For instance, receiver offset can introduce significant error and limit I/O voltage margin in some instances. Circuit redundancy can be used to improve receiver sensitivity. In some implementations, circuit redundancy can be optimized to address the standard deviation offset of data samplers used in the MCPL. For instance, an example data sampler can be provided that is designed to a three (3) standard deviation offset specification. In the examples of FIGS. 6 and 7, for instance, were two (2) data samplers to be used for each receiver (e.g., for each lane), one hundred (100) samplers would be used for a fifty (50) lane MCPL. In this example, the probability that one of the receiver (RX) lanes fails the three standard deviation offset specification is 24%. A chip reference voltage generator can be provided to set the offset upper-bound and move to the next data sampler on the receiver if another one of the other data samplers is found to be exceeding the bound. However, were four (4) data samplers to be used per receiver (i.e., instead of two in this example), the receiver will only fail if three out of four samplers fail. For a fifty-lane MCPL, as in the examples of FIGS. 6 and 7, adding this additional circuit redundancy can dramatically reduce the failure rate from 24% to less than 0.01%.

In still other examples, at very high data rates, per bit duty cycle correction (DCC) and deskew can be used to augment baseline per cluster DCC and deskew to improve link margin. Instead of correction for all cases, as in traditional solutions, in some implementations a low power digital implementation can be utilized that senses and corrects the outliers where the I/O lane would fail. For instance, a global tuning of the lanes can be performed to identify problem lanes within the cluster. These problem lanes can then be targeted for per-lane tuning to achieve the high data rates supported by the MCPL.

Additional features can also be optionally implemented in some examples of a MCPL to enhance the performance characteristics of the physical link. For instance, line coding can be provided. While mid-rail terminations, such as described above, can allow for DC data bus inversion (DBI) to be omitted, AC DBI can still be used to reduce the dynamic power. More complicated coding can also be used to eliminate the worst case difference of 1's and 0's to reduce, for instance, the drive requirement of mid-rail regulator, as well as limit I/O switching noise, among other example benefits. Further, transmitter equalization can also be optionally implemented. For instance, at very high data rates, insertion loss can be a significant for an in-package channel. A two-tap weight transmitter equalization (e.g., performed during an initial power-up sequence) can, in some cases, be sufficient to mitigate some of these issues, among others.

Figure 11:
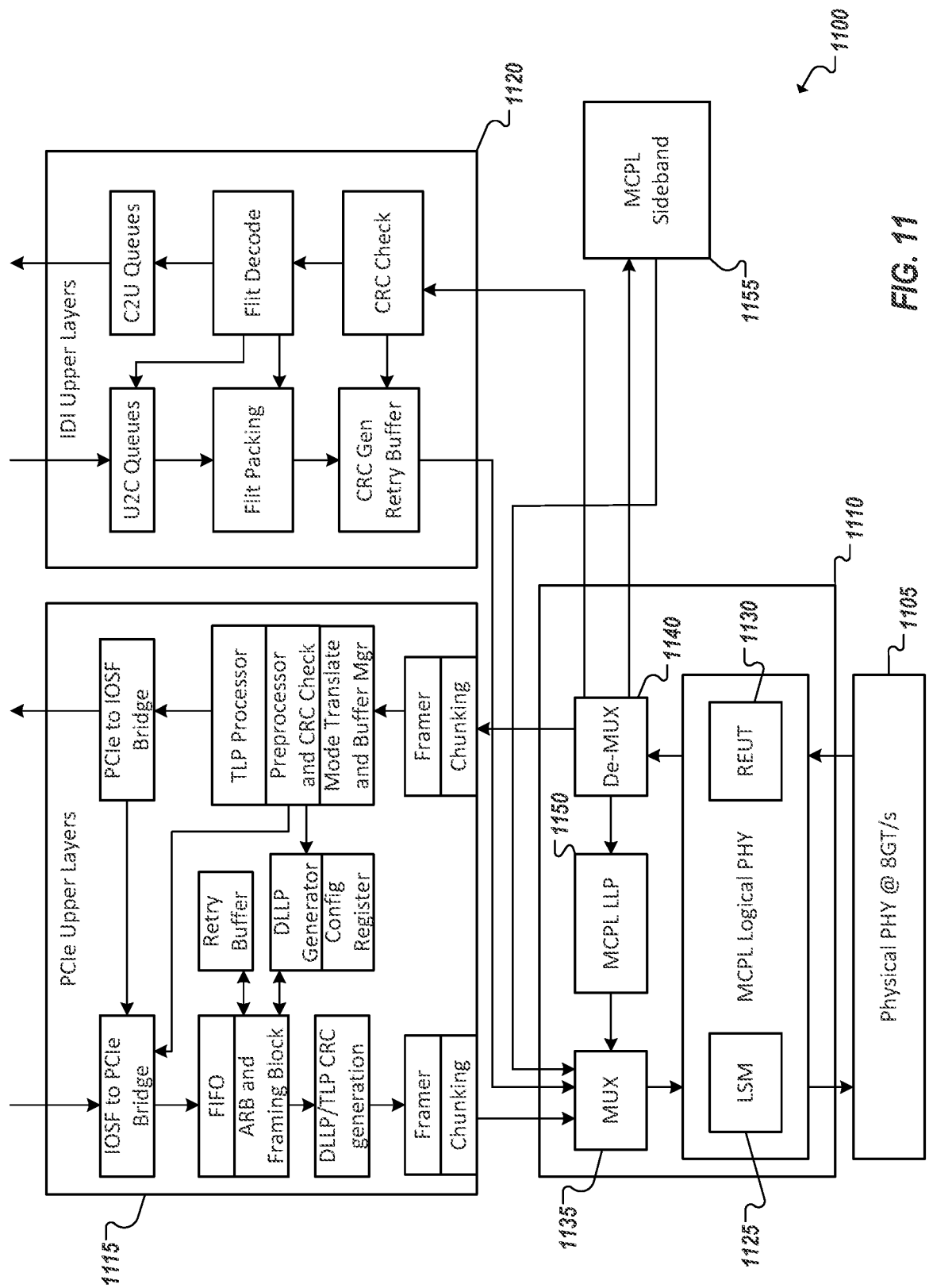
FIG. 11 is a simplified block diagram of an MCPL.

Turning to FIG. 11, a simplified block diagram 1100 is shown illustrating an example logical PHY of an example MCPL. A physical PHY 1105 can connect to a die that includes logical PHY 1110 and additional logic supporting a link layer of the MCPL. The die, in this example, can further include logic to support multiple different protocols on the MCPL. For instance, in the example of FIG. 11, PCIe logic 1115 can be provided as well as IDI logic 1120, such that the dies can communicate using either PCIe or IDI over the same MCPL connecting the two dies, among potentially many other examples, including examples where more than two protocols or protocols other than PCIe and IDI are supported over the MCPL. Various protocols supported between the dies can offer varying levels of service and features.

Logical PHY 1110 can include link state machine management logic 1125 for negotiating link state transitions in connection with requests of upper layer logic of the die (e.g., received over PCIe or IDI). Logical PHY 1110 can further include link testing and debug logic (e.g., 1130) ion some implementations. As noted above, an example MCPL can support control signals that are sent between dies over the MCPL to facilitate protocol agnostic, high performance, and power efficiency features (among other example features) of the MCPL. For instance, logical PHY 1110 can support the generation and sending, as well as the receiving and processing of valid signals, stream signals, and LSM sideband signals in connection with the sending and receiving of data over dedicated data lanes, such as described in examples above.

In some implementations, multiplexing (e.g., 1135) and demultiplexing (e.g., 1140) logic can be included in, or be otherwise accessible to, logical PHY 1110. For instance, multiplexing logic (e.g., 1135) can be used to identify data (e.g., embodied as packets, messages, etc.) that is to be sent out onto the MCPL. The multiplexing logic 1135 can identify the protocol governing the data and generate a stream signal that is encoded to identify the protocol. For instance, in one example implementation, the stream signal can be encoded as a byte of two hexadecimal symbols (e.g., IDI: FFh; PCIe: F0h; LLP: AAh; sideband: 55h; etc.), and can be sent during the same window (e.g., a byte time period window) of the data governed by the identified protocol. Similarly, demultiplexing logic 1140 can be employed to interpret incoming stream signals to decode the stream signal and identify the protocol that is to apply to data concurrently received with the stream signal on the data lanes. The demultiplexing logic 1140 can then apply (or ensure) protocol-specific link layer handling and cause the data to be handled by the corresponding protocol logic (e.g., PCIe logic 1115 or IDI logic 1120).

Logical PHY 1110 can further include link layer packet logic 1150 that can be used to handle various link control functions, including power management tasks, loopback, disable, re-centering, scrambling, etc. LLP logic 1150 can facilitate link layer-to-link layer messages over MCLP, among other functions. Data corresponding to the LLP signaling can be also be identified by a stream signal sent on a dedicated stream signal lane that is encoded to identify that the data lanes LLP data. Multiplexing and demultiplexing logic (e.g., 1135, 1140) can also be used to generate and interpret the stream signals corresponding to LLP traffic, as well as cause such traffic to be handled by the appropriate die logic (e.g., LLP logic 1150). Likewise, as some implementations of an MCLP can include a dedicated sideband (e.g., sideband 1155 and supporting logic), such as an asynchronous and/or lower frequency sideband channel, among other examples.

Logical PHY logic 1110 can further include link state machine management logic that can generate and receive (and use) link state management messaging over a dedicated LSM sideband lane. For instance, an LSM sideband lane can be used to perform handshaking to advance link training state, exit out of power management states (e.g., an L1 state), among other potential examples. The LSM sideband signal can be an asynchronous signal, in that it is not aligned with the data, valid, and stream signals of the link, but instead corresponds to signaling state transitions and align the link state machine between the two die or chips connected by the link, among other examples. Providing a dedicated LSM sideband lane can, in some examples, allow for traditional squelch and received detect circuits of an analog front end (AFE) to be eliminated, among other example benefits.

Figure 12:
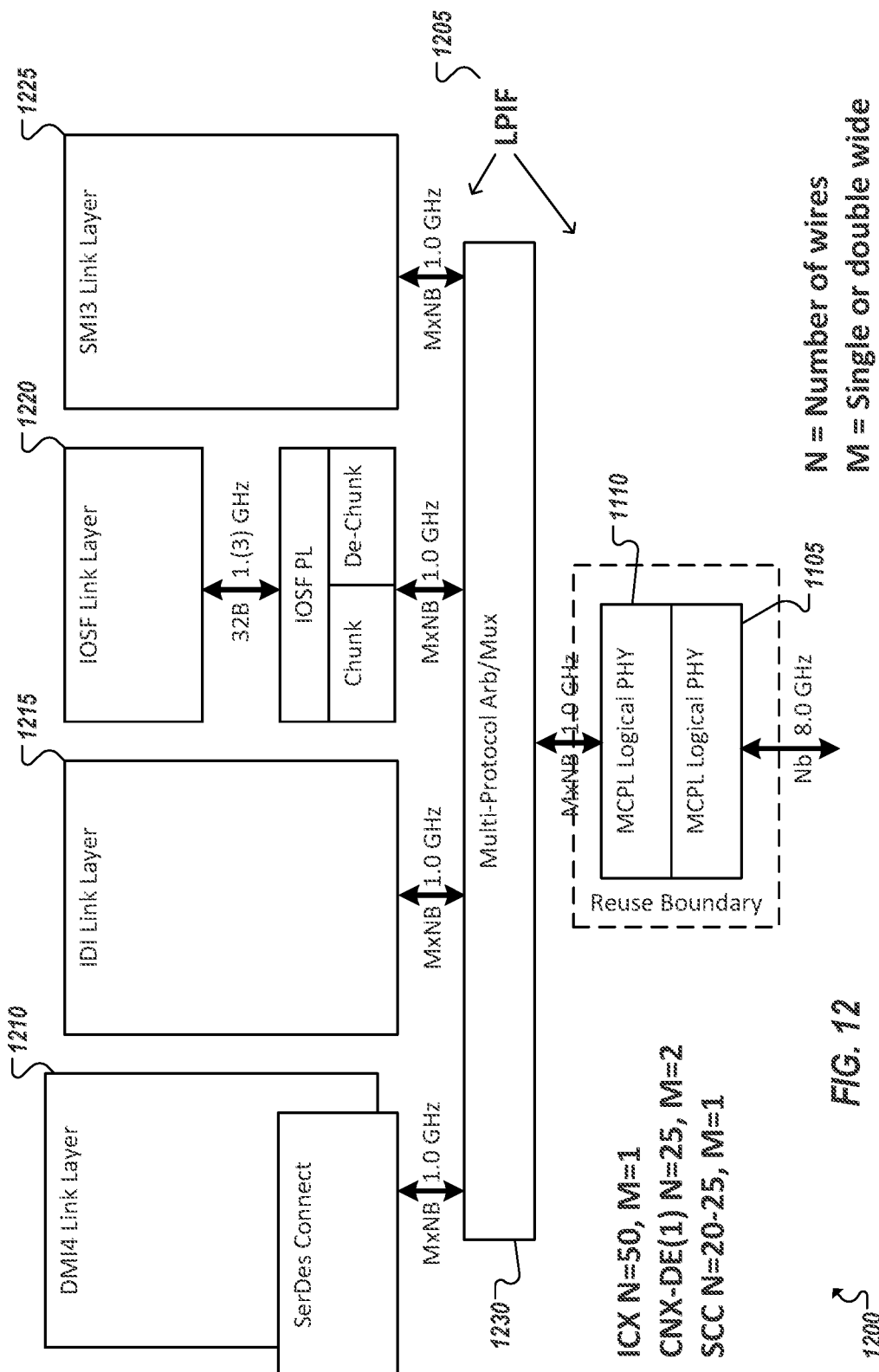
FIG. 12 is a simplified block diagram of an MCPL interfacing with upper layer logic of multiple protocols using a logical PHY interface (LPIF).

Turning to FIG. 12, a simplified block diagram 1200 is shown illustrating another representation of logic used to implement an MCPL. For instance, logical PHY 1110 is provided with a defined logical PHY interface (LPIF) 1205 through which any one of a plurality of different protocols (e.g., PCIe, IDI, QPI, etc.) 1210, 1215, 1220, 1225 and signaling modes (e.g., sideband) can interface with the physical layer of an example MCPL. In some implementations, multiplexing and arbitration logic 1230 can also be provided as a layer separate from the logical PHY 1110. In one example, the LPIF 1205 can be provided as the interface on either side of this MuxArb layer 1230. The logical PHY 1110 can interface with the physical PHY (e.g., the analog front end (AFE) 1105 of the MCPL PHY) through another interface.

The LPIF can abstract the PHY (logical and electrical/analog) from the upper layers (e.g., 1210, 1215, 1220, 1225) such that a completely different PHY can be implemented under LPIF transparent to the upper layers. This can assist in promoting modularity and re-use in design, as the upper layers can stay intact when the underlying signaling technology PHY is updated, among other examples. Further, the LPIF can define a number of signals enabling multiplexing/demultiplexing, LSM management, error detection and handling, and other functionality of the logical PHY. For instance, Table 1 summarizes at least a portion of signals that can be defined for an example LPIF:

TABLE 1

| Signal Name | Description |
| --- | --- |
| Rst | Reset |
| Lclk | Link Clock - 8UI of PHY clock |
| Pl_trdy | Physical Layer is ready to accept data, data is accepted by Physical layer when Pl_trdy and Lp_valid are both asserted. |
| Pl_data[N-1:0][7:0] | Physical Layer-to-Link Layer data, where N equals the number of lanes. |
| Pl_valid | Physical Layer-to-Link Layer signal indicating data valid |
| Pl_Stream[7:0] | Physical Layer-to-Link Layer signal indicating the stream ID received with received data |
| Pl_error | Physical layer detected an error (e.g., framing or training) |
| Pl_AlignReq | Physical Layer request to Link Layer to align packets at LPIF width boundary |
| Pl_in_L0 | Indicates that link state machine (LSM) is in L0 |
| Pl_in_retrain | Indicates that LSM is in Retrain/Recovery |
| Pl_rejectL1 | Indicates that the PHY layer has rejected entry into L1. |
| Pl_in_L12 | Indicates that LSM is in L1 or L2. |
| Pl_LSM (3:0) | Current LSM state information |
| Lp_data[N-1:0][7:0] | Link Layer-to-Physical Layer Data, where N equals number of lanes. |
| Lp_Stream[7:0] | Link Layer-to-Physical Layer signal indicating the stream ID to use with data |
| Lp_AlignAck | Link Layer to Physical layer indicates that the packets are aligned LPIF width boundary |
| Lp_valid | Link Layer-to-Physical Layer signal indicating data valid |
| Lp_enterL1 | Link Layer Request to Physical Layer to enter L1 |
| Lp_enterL2 | Link Layer Request to Physical Layer to enter L2 |
| Lp_Retrain | Link Layer Request to Physical Layer to Retrain the PHY |
| Lp_exitL12 | Link Layer Request to Physical Layer to exit L1, L2 |
| Lp_Disable | Link Layer Request to Physical Layer to disable PHY |

Figure 13:
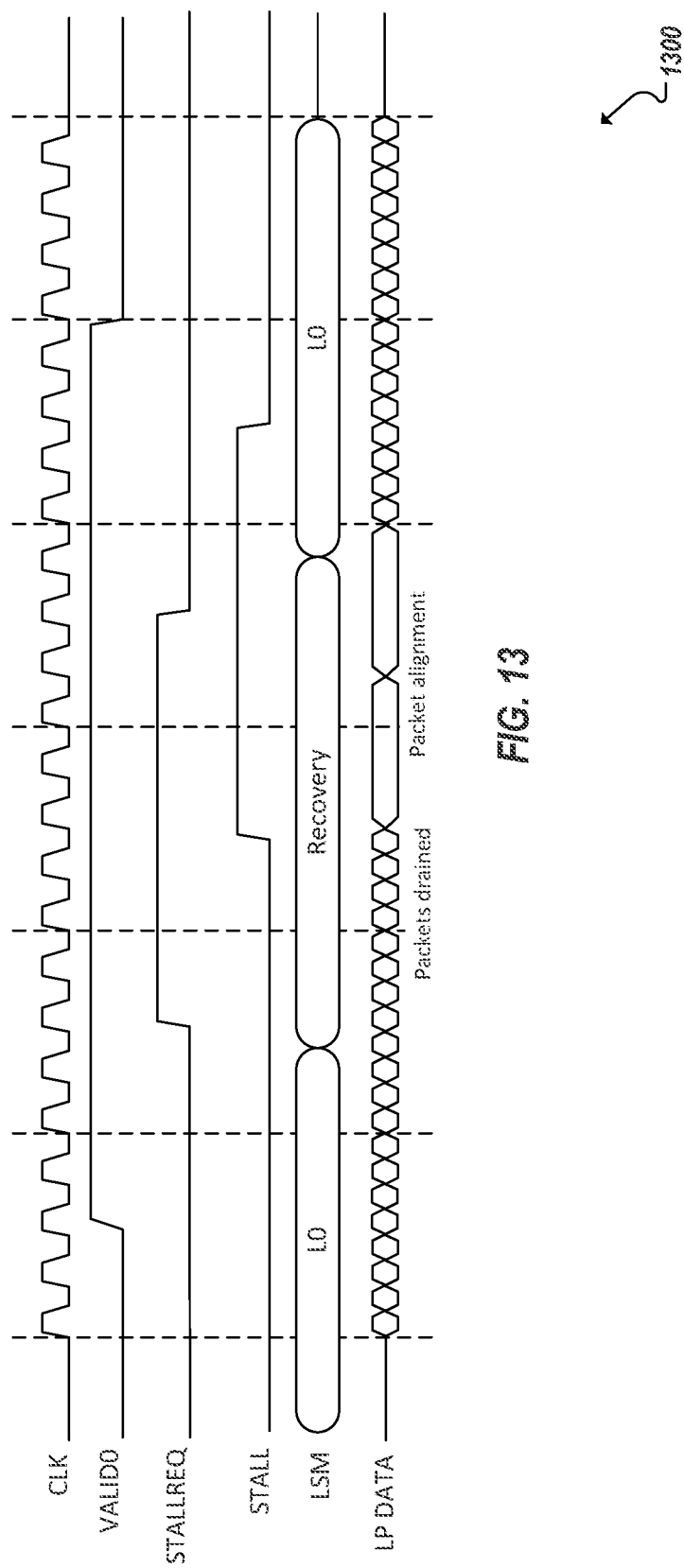
FIG. 13 is a representation of example signaling on an example MCPL in connection with a recovery of a link.

As noted in Table 1, in some implementations, an alignment mechanism can be provided through an AlignReq/AlignAck handshake. For example, when the physical layer enters recovery, some protocols may lose packet framing. Alignment of the packets can be corrected, for instance, to guarantee correct framing identification by the link layer. Additionally, as shown in FIG. 13, the physical layer can assert a StallReq signal when it enters recovery, such that the link layer asserts a Stall signal when a new aligned packet is ready to be transferred. The physical layer logic can sample both Stall and Valid to determine if the packet is aligned. For instance, the physical layer can continue to drive trdy to drain the link layer packets until Stall and Valid are sampled asserted, among other potential implementations, including other alternative implementations using Valid to assist in packet alignment.

Various fault tolerances can be defined for signals on the MCPL. For instance, fault tolerances can be defined for valid, stream, LSM sideband, low frequency side band, link layer packets, and other types of signals. Fault tolerances for packets, messages, and other data sent over the dedicated data lanes of the MCPL can be based on the particular protocol governing the data. In some implementations, error detection and handling mechanisms can be provided, such as cyclic redundancy check (CRC), retry buffers, among other potential examples. As examples, for PCIe packets sent over the MCPL, 32-bit CRC can be utilized for PCIe transaction layer packets (TLPs) (with guaranteed delivery (e.g., through a replay mechanism)) and 16-bit CRC can be utilized for PCIe link layer packets (which may be architected to be lossy (e.g., where replay is not applied)). Further, for PCIe framing tokens, a particular hamming distance (e.g., hamming distance of four (4)) can be defined for the token identifier; parity and 4-bit CRC can also be utilized, among other examples. For IDI packets, on the other hand, 16-bit CRC can be utilized.

In some implementations, fault tolerances can be defined for link layer packets (LLPs) that include requiring a valid signal to transition from low to high (i.e., 0-to-1) (e.g., to assist in assuring bit and symbol lock). Further, in one example, a particular number of consecutive, identical LLPs can be defined to be sent and responses can be expected to each request, with the requestor retrying after a response timeout, among other defined characteristics that can be used as the basis of determining faults in LLP data on the MCPL. In further examples, fault tolerance can be provided for a valid signal, for instance, through extending the valid signal across an entire time period window, or symbol (e.g., by keeping the valid signal high for eight UIs). Additionally, errors or faults in stream signals can be prevented by maintaining a hamming distance for encodings values of the stream signal, among other examples.

Implementations of a logical PHY can include error detection, error reporting, and error handling logic. In some implementations, a logical PHY of an example MCPL can include logic to detect PHY layer de-framing errors (e.g., on the valid and stream lanes), sideband errors (e.g., relating to LSM state transitions), errors in LLPs (e.g., that are critical to LSM state transitions), among other examples. Some error detection/resolution can be delegated to upper layer logic, such as PCIe logic adapted to detect PCIe-specific errors, among other examples.

In the case of de-framing errors, in some implementations, one or more mechanisms can be provided through error handling logic. De-framing errors can be handled based on the protocol involved. For instance, in some implementations, link layers can be informed of the error to trigger a retry. De-framing can also cause a realignment of the logical PHY de-framing. Further, re-centering of the logical PHY can be performed and symbol/window lock can be reacquired, among other techniques. Centering, in some examples, can include the PHY moving the receiver clock phase to the optimal point to detect the incoming data. "Optimal," in this context, can refer to where it has the most margin for noise and clock jitter. Re-centering can include simplified centering functions, for instance, performed when the PHY wakes up from a low power state, among other examples.

Other types of errors can involve other error handling techniques. For instance, errors detected in a sideband can be caught through a time-out mechanism of a corresponding state (e.g., of an LSM). The error can be logged and the link state machine can then be transitioned to Reset. The LSM can remain in Reset until a restart command is received from software. In another example, LLP errors, such as a link control packet error, can be handled with a time-out mechanism that can re-start the LLP sequence if an acknowledgement to the LLP sequence is not received.

FIGS. 14A-14C illustrate representations of example bit mappings on data lanes of an example MCPL for various types of data. For instance, an example MCPL can include fifty data lanes. FIG. 14A illustrates a first bit mapping of example 16 byte slots in a first protocol, such as IDI, that can be sent over the data lanes within an 8UI symbol, or window. For instance, within the defined 8UI window, three 16 byte slots, including a header slot, can be sent. Two bytes of data remain, in this example, and these remaining two bytes can be utilized CRC bits (e.g., in lanes DATA[48] and DATA [49]).

Figure 16:
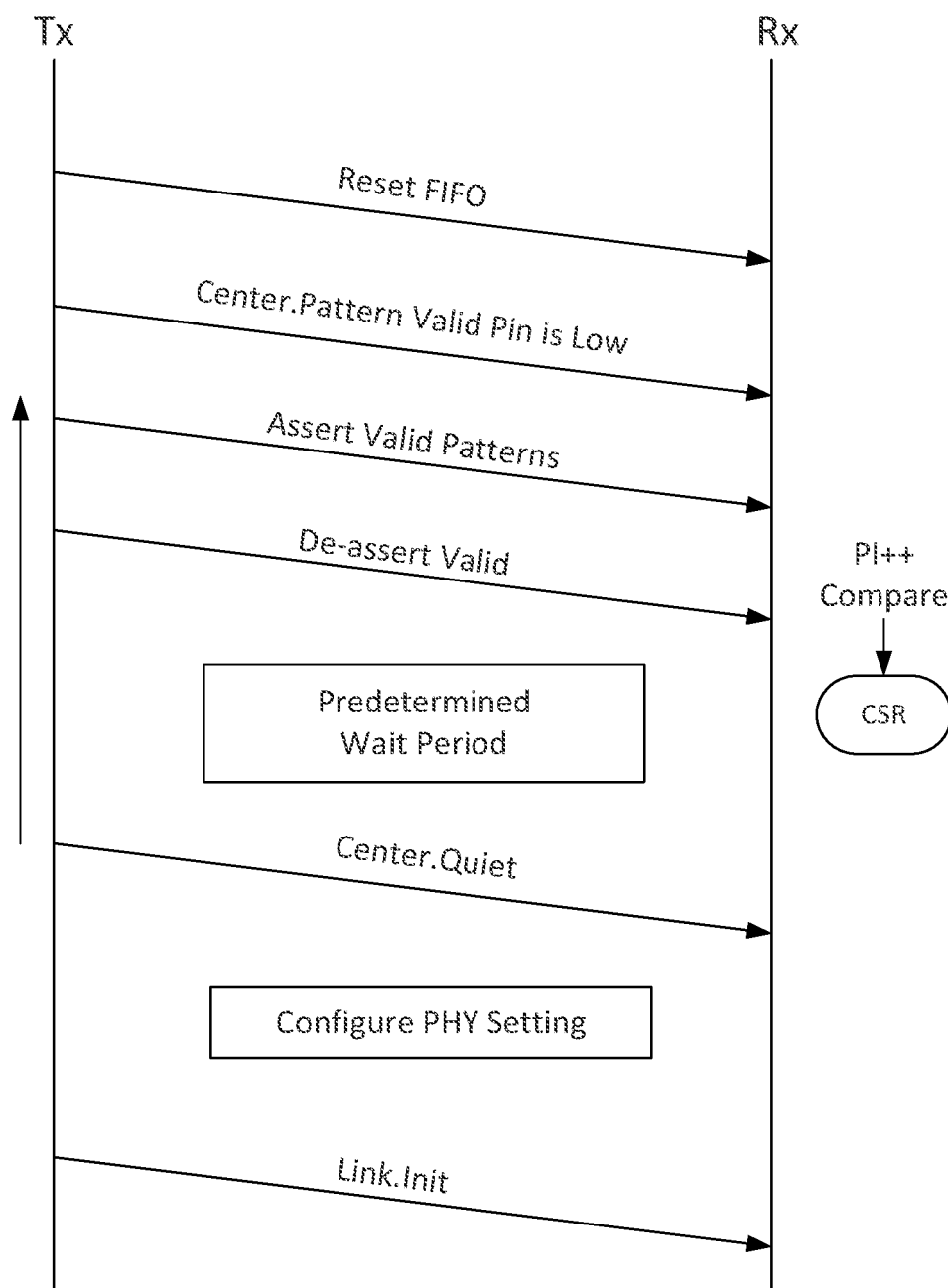
FIG. 16 is a representation of a flow associated with an example centering of a link.

In another example, FIG. 14B illustrates a second example bit mapping for PCIe packet data sent over the fifty data lanes of an example MCPL. In the example of FIG. 14B, 16 bytes packets (e.g., transaction layer (TLP) or data link layer (DLLP) PCIe packets) can be sent over the MCPL. In an 8UI window, three packets can be sent, with the remaining two bytes of bandwidth left unused within the window. Framing tokens can be included in these symbols and used to locate the start and end of each packet. In one example of PCIe, the framing utilized in the example of FIG. 14B can be the same as those token implemented for PCIe at 8GT/s.

In yet another example, illustrated in FIG. 14C, an example bit mapping of link-to-link packets (e.g., LLP packets) sent over an example MCPL is shown. LLPs can be 4 bytes each and each LLP (e.g., LLP0, LLP1, LLP2, etc.) can be sent four consecutive times, in accordance with fault tolerance and error detection within an example implementation. For instance, failure to receive four consecutive identical LLPs can indicate an error. Additionally, as with other data types, failure to receive a VALID in a proceeding time window, or symbol, can also indicate an error. In some instances, LLPs can have fixed slots. Additionally, in this example, unused, or "spare," bits in the byte time period, can result in logical 0s being transmitted over two of the fifty lanes (e.g., DATA[48-49]), among other examples.

Figure 15:
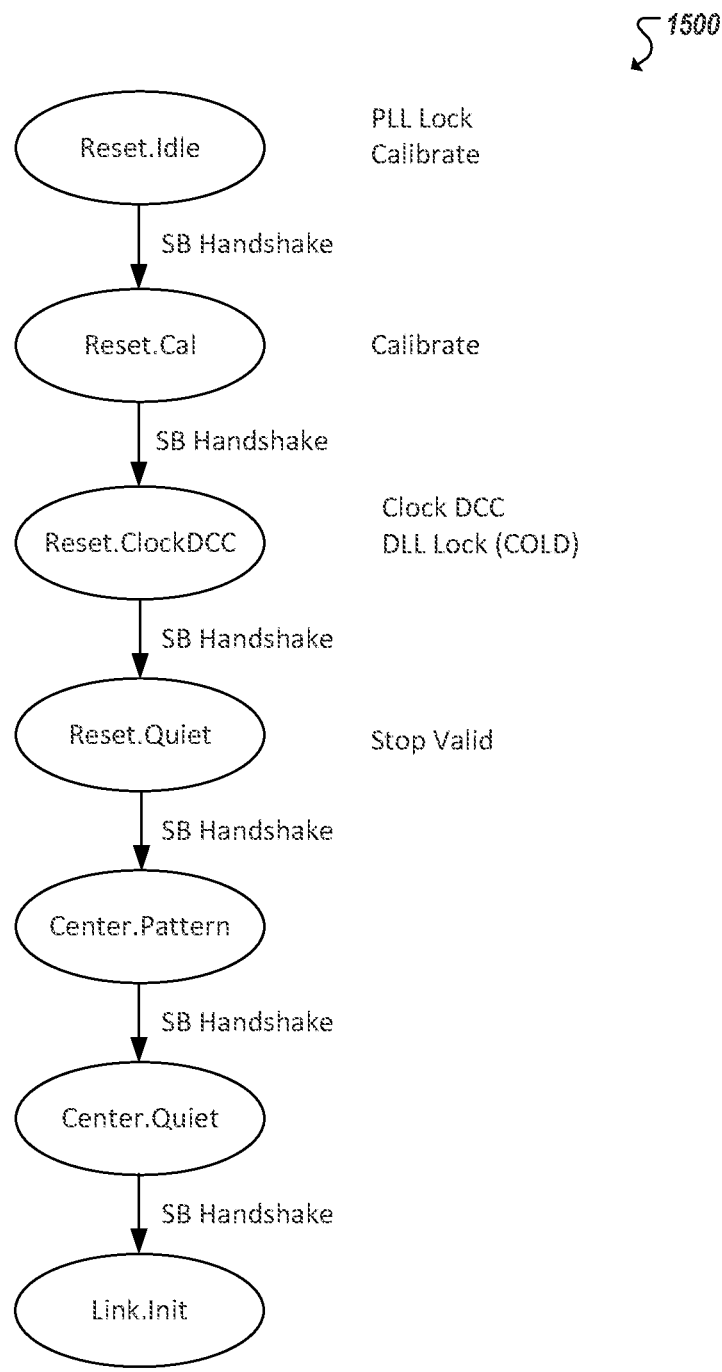
FIG. 15 is a representation of a portion of an example link state machine.

Turning to FIG. 15, a simplified link state machine transition diagram 1400 is shown together with sideband handshaking utilized between the state transitions. For instance, a Reset.Idle state (e.g., where phase lock loop (PLL) lock calibration is performed) can transition, through a sideband handshake, to a Reset.Cal state (e.g., where the link is further calibrated). Reset.Cal can transition, through a sideband handshake, to a Reset.ClockDCC state (e.g., where duty cycle correction (DCC) and delay-locked looping (DLL) lock can be performed). An additional handshake can be performed to transition from Reset.ClockDCC to a Reset.Quiet state (e.g., to deassert the Valid signal). To assist in alignment of signaling on the lanes of the MCPL, the lanes can be centered through a Center.Pattern state.

In some implementations, as shown in the example of FIG. 16, during the Center.Pattern state, the transmitter can generate training patterns or other data. The receiver can condition its receiver circuitry to receive such training patterns, for instance, by setting the phase interpolator position and vref position and setting the comparator. The receiver can continuously compare the patterns received with expected patterns and store the result in a register. After one set of patterns are complete, the receiver can increment the phase interpolator setting keeping the vref the same. The test pattern generation and comparison process can continue and new compare results can be stored in the register with the procedure repeatedly stepping through all phase interpolator values and through all values of vref. The Center.Quiet state can be entered when the pattern generation and comparison process is all complete. Following the centering of the lanes through the Center.Pattern and Center Quiet link states, a sideband handshake (e.g., using an LSM sideband signal over the dedicated LSM sideband lane of the link) can be facilitated to transition to a Link.Init state to initialize the MCPL and enable sending of data on the MCPL.

Returning momentarily to the discussion of FIG. 15, as noted above, sideband handshakes can be used to facilitate link state machine transitions between dies or chips in a multi-chip package. For instance, signals on the LSM sideband lanes of an MCPL can be used to synchronize the state machine transitions across the die. For example, when the conditions to exit a state (e.g., Reset.Idle) are met, the side that met those conditions can assert, on its outbound LSM_SB lane, an LSM sideband signal and wait for the other remote die to reach the same condition and assert an LSM sideband signal on its LSM_SB lane. When both LSM_SB signals are asserted the link state machine of each respective die can transition to the next state (e.g., a Reset.Cal state). A minimum overlap time can be defined during which both LSM_SB signals should be kept asserted prior to transitioning state. Further, a minimum quiesce time can be defined after LSM_SB is de-asserted to allow for accurate turn-around detection. In some implementations, every link state machine transition can be conditioned on and facilitated by such LSM_SB handshakes.

Figure 17:
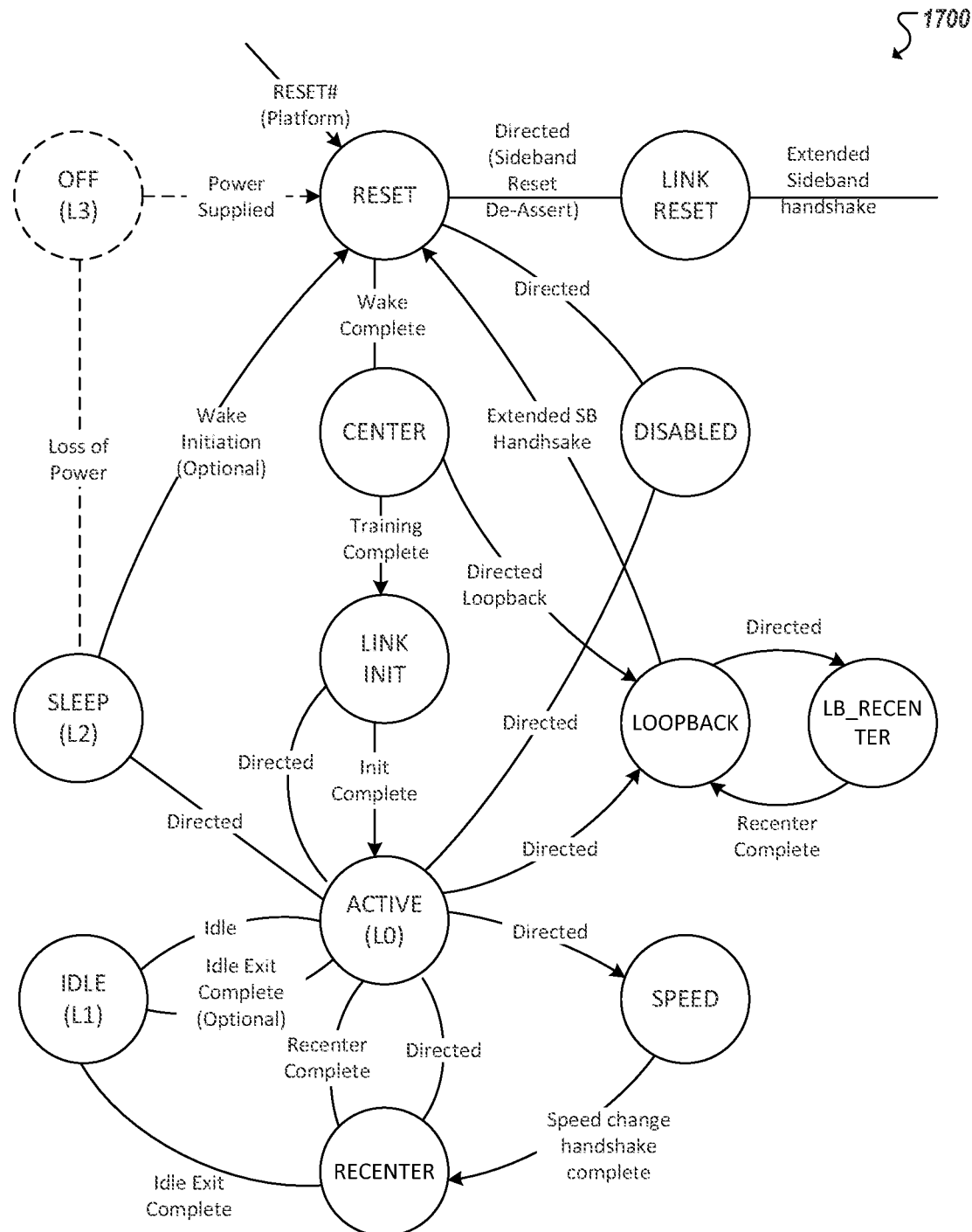
FIG. 17 is a representation of an example link state machine.

FIG. 17 is a more detailed link state machine diagram 1700, illustrating at least some of the additional link states and link state transitions that can be included in an example MCPL. In some implementations, an example link state machine can include, among the other states and state transitions illustrated in FIG. 17, a "Directed Loopback" transition can be provided to place the lanes of an MCPL into a digital loopback. For instance, the receiver lanes of an MCPL can be looped back to the transmitter lanes after the clock recovery circuits. An "LB_Recenter" state can also be provided in some instances, which can be used to align the data symbols. Additionally, as shown in FIG. 15, MCPL can support multiple link states, including an active L0 state and low power states, such as an L1 idle state, and L2 sleep state, among potentially other examples.

Figure 18:
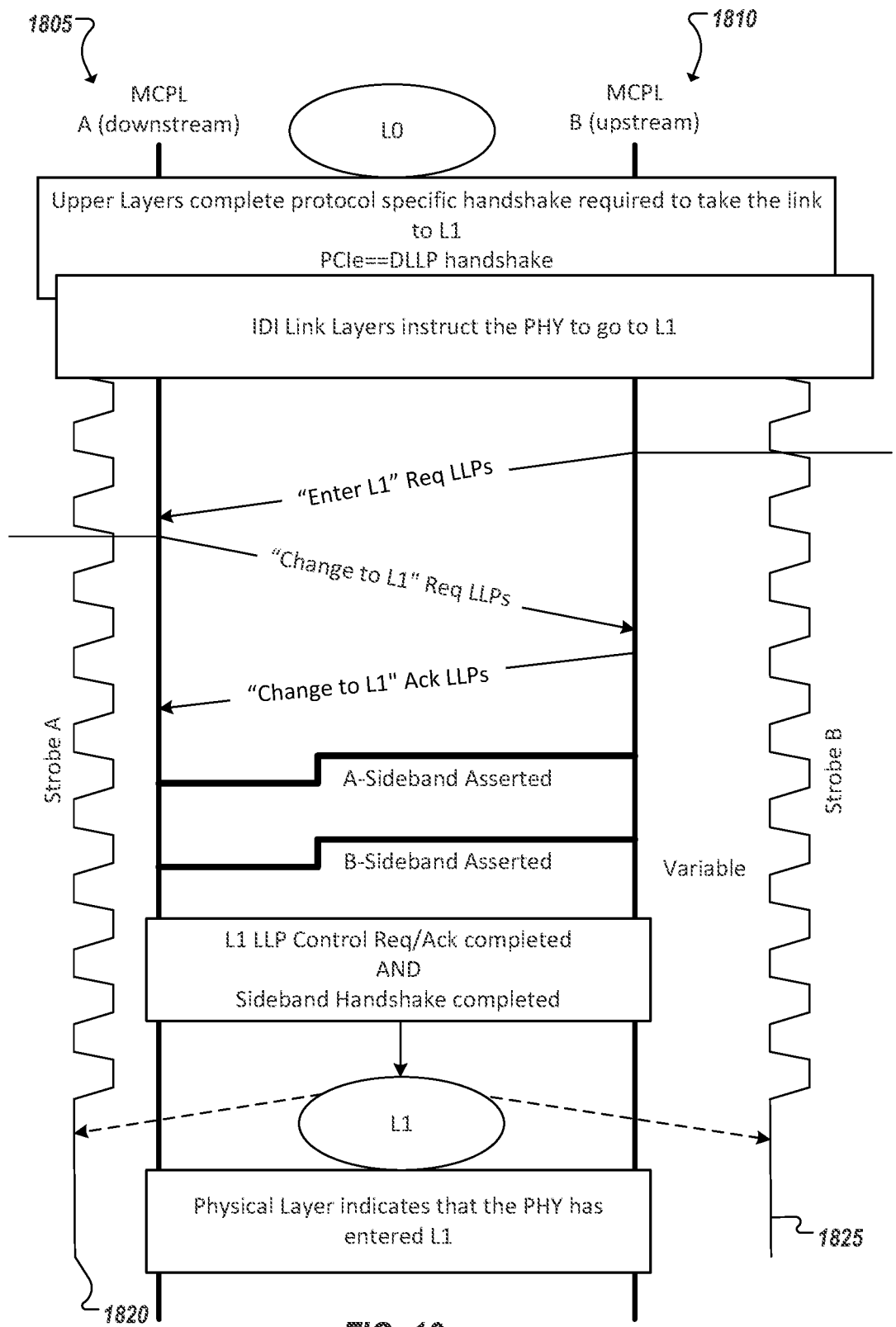
FIG. 18 is a representation of signaling to enter a low power state.

FIG. 18 is a simplified block diagram 1800 illustrating an example flow in a transition between an active state (e.g., L0) and a low-power, or idle, state (e.g., L1). In this particular example, a first device 1805 and a second device 1810 are communicatively coupled using an MCPL. While in the active state, data is transmitted over the lanes of the MCPL (e.g., DATA, VALID, STREAM, etc.). Link layer packets (LLPs) can be communicated over the lanes (e.g., data lanes, with the stream signal indicating that the data is LLP data), to assist in facilitating link state transitions. For instance, LLPs can be sent between the first and second devices 1805, 1810 to negotiate entry from L0 into L1. For instance, upper layer protocols supported by the MCPL can communicate that entry into L1 (or another state) is desired and the upper layer protocols can cause LLPs to be sent over the MCPL to facilitate a link layer handshake to cause the physical layer to enter L1. For instance, FIG. 18 shows at least a portion of LLPs sent including an "Enter L1" request LLP sent from the second (upstream) device 1810 to the first (downstream) device 1805. In some implementations, and upper level protocols, the downstream port does not initiate the entry into L1. The receiving first device 1805 can send a "Change to L1" request LLP in response, which the second device 1810 can acknowledge through a "Change to L1" acknowledgement (ACK) LLP, among other examples. Upon detecting completion of the handshake, the logical PHY can cause a sideband signal to be asserted on a dedicated sideband link to acknowledge that the ACK was received and that the device (e.g., 1805) is ready for and expecting entry into L1. For instance, the first device 1805 can assert a sideband signal 1815 sent to the second device 1810 to confirm receipt of the final ACK in the link layer handshake Additionally, the second device 1810 can also assert a sideband signal in response to sideband signal 1815 to notify the first device 1805 of the first device's sideband ACK 1805. With the link layer control and sideband handshakes completed, the MCPL PHY can be transitioned into the L1 state causing all lanes of the MCPL to be put into idle power savings mode, including respective MCPL strobes of the 1820, 1825 of the devices 1805, 1810. The L1 can be exited upon upper level layer logic of one of the first and second devices 1805, 1810 requesting re-entry into L0, for instance, in response to detecting data to be sent to the other device over the MCPL.

As noted above, in some implementations, an MCPL can facilitate communication between two devices supporting potentially multiple different protocols, and the MCPL can facilitate communications according to potentially any one of the multiple protocols over the lanes of the MCPL. Facilitating multiple protocols, however, can complicate entry and reentry into at least some link states. For instance, while some traditional interconnects have a single upper layer protocol assuming the role of master in state transitions, an implementation of MCPL with multiple different protocols effectively involves multiple masters. As an example, as shown in FIG. 18, each of PCIe and IDI can be supported between two devices 1805, 1810 over an implementation of an MCPL. For instance, placing the physical layer into an idle or low power state may be conditioned on permission first being obtained from each of the supported protocols (e.g., both PCIe and IDI).

In some instances, entry into L1 (or another state) may be requested by only one of the multiple, supported protocols supported for an implementation of an MCPL. While there may be a likelihood that the other protocols will likewise request entry into the same state (e.g., based on identifying similar conditions (e.g., little or no traffic) on the MCPL), the logical PHY can wait until permission or instructions are received from each upper layer protocol before actually facilitating the state transition. The logical PHY can track which upper layer protocols have requested the state change (e.g., performed a corresponding handshake) and trigger the state transition upon identifying that each of the protocols have requested the particular state change, such as a transition from L0 to L1 or another transition that would affect or interfere with other protocols' communications. In some implementations, protocols can be blind as to their at least partial dependence on other protocols in the system. Further, in some instances, a protocol may expect a response (e.g., from the PHY) to a request to enter a particular state, such as a confirmation or rejection of the requested state transition. Accordingly, in such instances, while waiting for permission from other supported protocols for entry into an idle link state, the logical PHY can generate synthetic responses to a request to enter the idle state to "trick" the requesting upper layer protocol into believing that a particular state has been entered (when, in reality, the lanes are still active, at least until the other protocols also request entry into the idle state). Among other potential advantages, this can simplify coordinating entry into the low power state between multiple protocols, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 19:
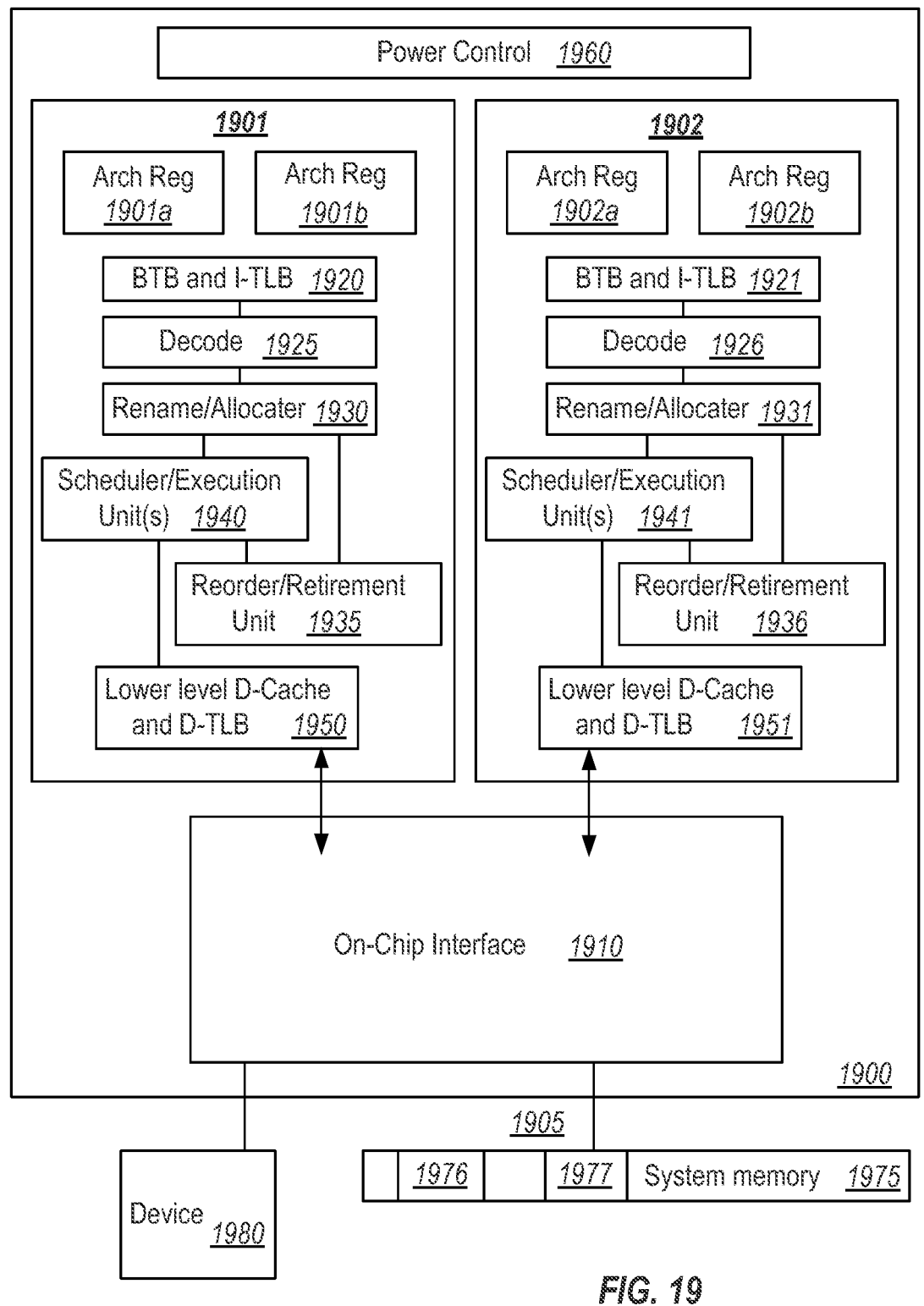
FIG. 19 illustrates an embodiment of a block diagram for a computing system including a multi core processor.

Referring to FIG. 19, an embodiment of a block diagram for a computing system including a multicore processor is depicted. Processor 1900 includes any processor or processing device, such as a microprocessor, an embedded processor, a digital signal processor (DSP), a network processor, a handheld processor, an application processor, a co-processor, a system on a chip (SOC), or other device to execute code. Processor 1900, in one embodiment, includes at least two cores—core 1901 and 1902, which may include asymmetric cores or symmetric cores (the illustrated embodiment). However, processor 1900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1900, as illustrated in FIG. 19, includes two cores—core 1901 and 1902. Here, core 1901 and 1902 are considered symmetric cores, i.e. cores with the same configurations, functional units, and/or logic. In another embodiment, core 1901 includes an out-of-order processor core, while core 1902 includes an in-order processor core. However, cores 1901 and 1902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1901 are described in further detail below, as the units in core 1902 operate in a similar manner in the depicted embodiment.

As depicted, core 1901 includes two hardware threads 1901a and 1901b, which may also be referred to as hardware thread slots 1901a and 1901b. Therefore, software entities, such as an operating system, in one embodiment potentially view processor 1900 as four separate processors, i.e., four logical processors or processing elements capable of executing four software threads concurrently. As alluded to above, a first thread is associated with architecture state registers 1901a, a second thread is associated with architecture state registers 1901b, a third thread may be associated with architecture state registers 1902a, and a fourth thread may be associated with architecture state registers 1902b. Here, each of the architecture state registers (1901a, 1901b, 1902a, and 1902b) may be referred to as processing elements, thread slots, or thread units, as described above. As illustrated, architecture state registers 1901a are replicated in architecture state registers 1901b, so individual architecture states/contexts are capable of being stored for logical processor 1901a and logical processor 1901b. In core 1901, other smaller resources, such as instruction pointers and renaming logic in allocator and renamer block 1930 may also be replicated for threads 1901a and 1901b. Some resources, such as re-order buffers in reorder/retirement unit 1935, ILTB 1920, load/store buffers, and queues may be shared through partitioning. Other resources, such as general purpose internal registers, page-table base register(s), low-level data-cache and data-TLB 1915, execution unit(s) 1940, and portions of out-of-order unit 1935 are potentially fully shared.

Processor 1900 often includes other resources, which may be fully shared, shared through partitioning, or dedicated by/to processing elements. In FIG. 19, an embodiment of a purely exemplary processor with illustrative logical units/resources of a processor is illustrated. Note that a processor may include, or omit, any of these functional units, as well as include any other known functional units, logic, or firmware not depicted. As illustrated, core 1901 includes a simplified, representative out-of-order (OOO) processor core. But an in-order processor may be utilized in different embodiments. The OOO core includes a branch target buffer 1920 to predict branches to be executed/taken and an instruction-translation buffer (I-TLB) 1920 to store address translation entries for instructions.

Core 1901 further includes decode module 1925 coupled to fetch unit 1920 to decode fetched elements. Fetch logic, in one embodiment, includes individual sequencers associated with thread slots 1901a, 1901b, respectively. Usually core 1901 is associated with a first ISA, which defines/specifies instructions executable on processor 1900. Often machine code instructions that are part of the first ISA include a portion of the instruction (referred to as an opcode), which references/specifies an instruction or operation to be performed. Decode logic 1925 includes circuitry that recognizes these instructions from their opcodes and passes the decoded instructions on in the pipeline for processing as defined by the first ISA. For example, as discussed in more detail below decoders 1925, in one embodiment, include logic designed or adapted to recognize specific instructions, such as transactional instruction. As a result of the recognition by decoders 1925, the architecture or core 1901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1926, in one embodiment, recognize the same ISA (or a subset thereof). Alternatively, in a heterogeneous core environment, decoders 1926 recognize a second ISA (either a subset of the first ISA or a distinct ISA).

In one example, allocator and renamer block 1930 includes an allocator to reserve resources, such as register files to store instruction processing results. However, threads 1901a and 1901b are potentially capable of out-of-order execution, where allocator and renamer block 1930 also reserves other resources, such as reorder buffers to track instruction results. Unit 1930 may also include a register renamer to rename program/instruction reference registers to other registers internal to processor 1900. Reorder/retirement unit 1935 includes components, such as the reorder buffers mentioned above, load buffers, and store buffers, to support out-of-order execution and later in-order retirement of instructions executed out-of-order.

Scheduler and execution unit(s) block 1940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1950 are coupled to execution unit(s) 1940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1901 and 1902 share access to higher-level or further-out cache, such as a second level cache associated with on-chip interface 1910. Note that higher-level or further-out refers to cache levels increasing or getting further way from the execution unit(s). In one embodiment, higher-level cache is a last-level data cache last cache in the memory hierarchy on processor 1900—such as a second or third level data cache. However, higher level cache is not so limited, as it may be associated with or include an instruction cache. A trace cache—a type of instruction cache—instead may be coupled after decoder 1925 to store recently decoded traces. Here, an instruction potentially refers to a macro-instruction (i.e. a general instruction recognized by the decoders), which may decode into a number of micro-instructions (micro-operations).

In the depicted configuration, processor 1900 also includes on-chip interface module 1910. Historically, a memory controller, which is described in more detail below, has been included in a computing system external to processor 1900. In this scenario, on-chip interface 1910 is to communicate with devices external to processor 1900, such as system memory 1975, a chipset (often including a memory controller hub to connect to memory 1975 and an I/O controller hub to connect peripheral devices), a memory controller hub, a northbridge, or other integrated circuit. And in this scenario, bus 1905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1975 may be dedicated to processor 1900 or shared with other devices in a system. Common examples of types of memory 1975 include DRAM, SRAM, non-volatile memory (NV memory), and other known storage devices. Note that device 1980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1900. For example in one embodiment, a memory controller hub is on the same package and/or die with processor 1900. Here, a portion of the core (an on-core portion) 1910 includes one or more controller(s) for interfacing with other devices such as memory 1975 or a graphics device 1980. The configuration including an interconnect and controllers for interfacing with such devices is often referred to as an on-core (or un-core configuration). As an example, on-chip interface 1910 includes a ring interconnect for on-chip communication and a high-speed serial point-to-point link 1905 for off-chip communication. Yet, in the SOC environment, even more devices, such as the network interface, co-processors, memory 1975, graphics processor 1980, and any other known computer devices/interface may be integrated on a single die or integrated circuit to provide small form factor with high functionality and low power consumption.

In one embodiment, processor 1900 is capable of executing a compiler, optimization, and/or translator code 1977 to compile, translate, and/or optimize application code 1976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 20:
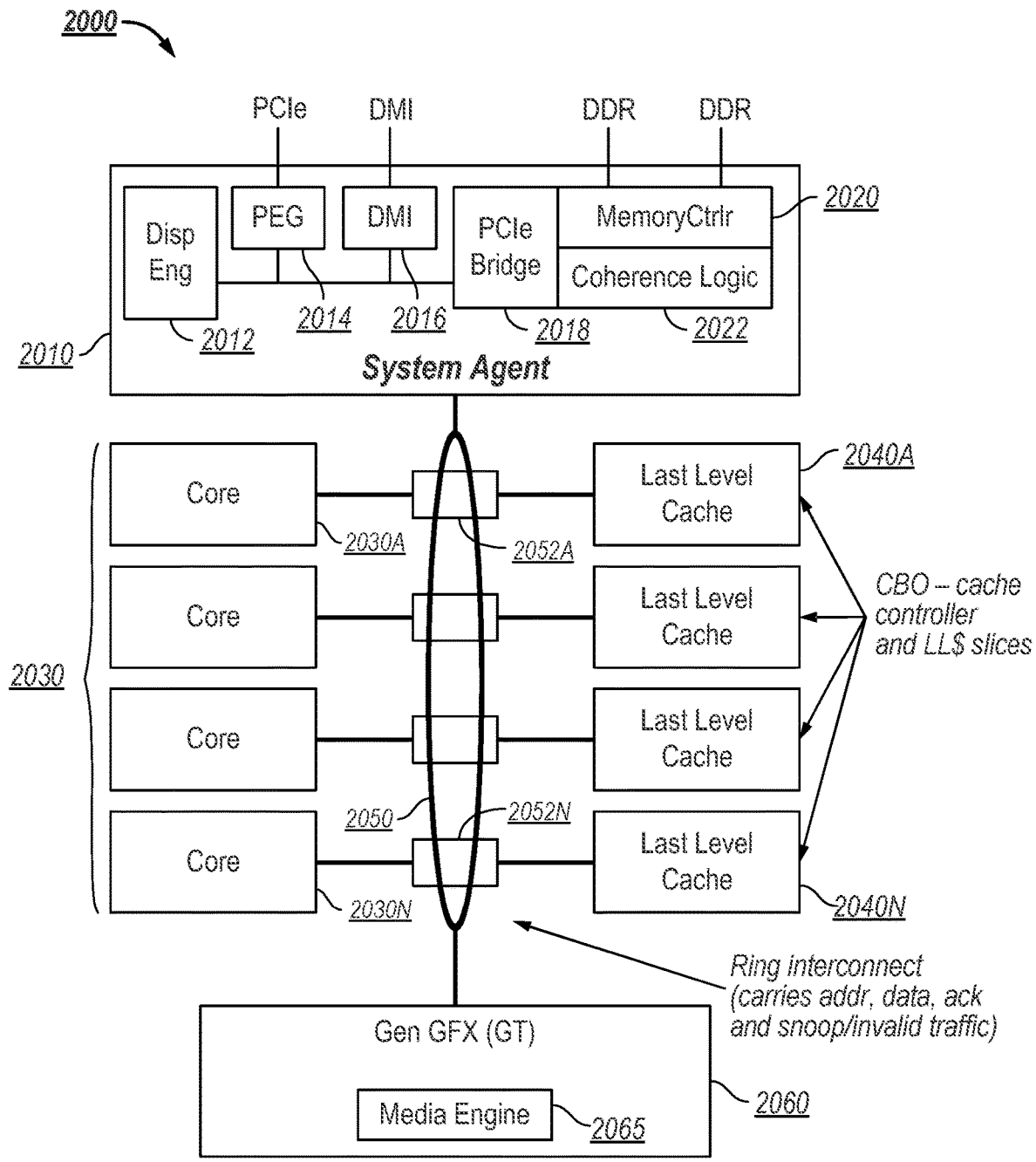
FIG. 20 illustrates another embodiment of a block diagram for a computing system including a multicore processor.

Referring now to FIG. 20, shown is a block diagram of an embodiment of a multicore processor. As shown in the embodiment of FIG. 20, processor 2000 includes multiple domains. Specifically, a core domain 2030 includes a plurality of cores 2030A-2030N, a graphics domain 2060 includes one or more graphics engines having a media engine 2065, and a system agent domain 2010.

In various embodiments, system agent domain 2010 handles power control events and power management, such that individual units of domains 2030 and 2060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 2030 and 2060 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 2030 further includes low level caches in addition to various execution units and additional processing elements. Here, the various cores are coupled to each other and to a shared cache memory that is formed of a plurality of units or slices of a last level cache (LLC) 2040A-2040N; these LLCs often include storage and cache controller functionality and are shared amongst the cores, as well as potentially among the graphics engine too.

As seen, a ring interconnect 2050 couples the cores together, and provides interconnection between the core domain 2030, graphics domain 2060 and system agent circuitry 2010, via a plurality of ring stops 2052A-2052N, each at a coupling between a core and LLC slice. As seen in FIG. 20, interconnect 2050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 2010 includes display engine 2012 which is to provide control of and an interface to an associated display. System agent domain 2010 may include other units, such as: an integrated memory controller 2020 that provides for an interface to a system memory (e.g., a DRAM implemented with multiple DIMMs; coherence logic 2022 to perform memory coherence operations. Multiple interfaces may be present to enable interconnection between the processor and other circuitry. For example, in one embodiment at least one direct media interface (DMI) 2016 interface is provided as well as one or more PCIe™ interfaces 2014. The display engine and these interfaces typically couple to memory via a PCIe™ bridge 2018. Still further, to provide for communications between other agents, such as additional processors or other circuitry, one or more other interfaces may be provided.

Figure 21:
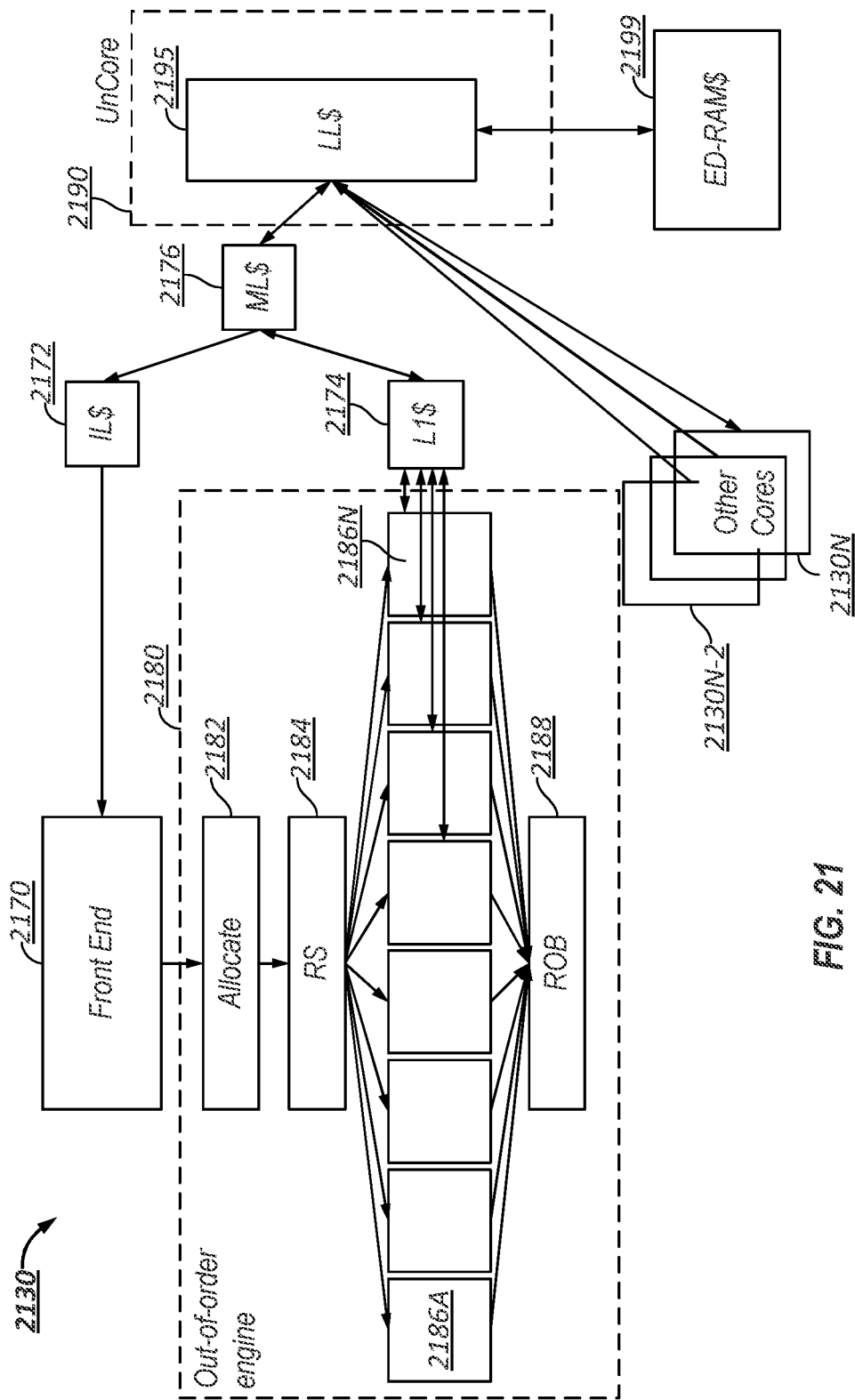
FIG. 21 illustrates an embodiment of a block diagram for a processor.

Referring now to FIG. 21, shown is a block diagram of a representative core; specifically, logical blocks of a back-end of a core, such as core 2030 from FIG. 20. In general, the structure shown in FIG. 21 includes an out-of-order processor that has a front end unit 2170 used to fetch incoming instructions, perform various processing (e.g. caching, decoding, branch predicting, etc.) and passing instructions/operations along to an out-of-order (OOO) engine 2180. OOO engine 2180 performs further processing on decoded instructions.

Specifically in the embodiment of FIG. 21, out-of-order engine 2180 includes an allocate unit 2182 to receive decoded instructions, which may be in the form of one or more micro-instructions or uops, from front end unit 2170, and allocate them to appropriate resources such as registers and so forth. Next, the instructions are provided to a reservation station 2184, which reserves resources and schedules them for execution on one of a plurality of execution units 2186A-2186N. Various types of execution units may be present, including, for example, arithmetic logic units (ALUs), load and store units, vector processing units (VPUs), floating point execution units, among others. Results from these different execution units are provided to a reorder buffer (ROB) 2188, which take unordered results and return them to correct program order.

Still referring to FIG. 21, note that both front end unit 2170 and out-of-order engine 2180 are coupled to different levels of a memory hierarchy. Specifically shown is an instruction level cache 2172, that in turn couples to a mid-level cache 2176, that in turn couples to a last level cache 2195. In one embodiment, last level cache 2195 is implemented in an on-chip (sometimes referred to as uncore) unit 2190. As an example, unit 2190 is similar to system agent 2010 of FIG. 20. As discussed above, uncore 2190 communicates with system memory 2199, which, in the illustrated embodiment, is implemented via ED RAM. Note also that the various execution units 2186 within out-of-order engine 2180 are in communication with a first level cache 2174 that also is in communication with mid-level cache 2176. Note also that additional cores 2130N-2-2130N can couple to LLC 2195. Although shown at this high level in the embodiment of FIG. 21, understand that various alterations and additional components may be present.

Figure 22:
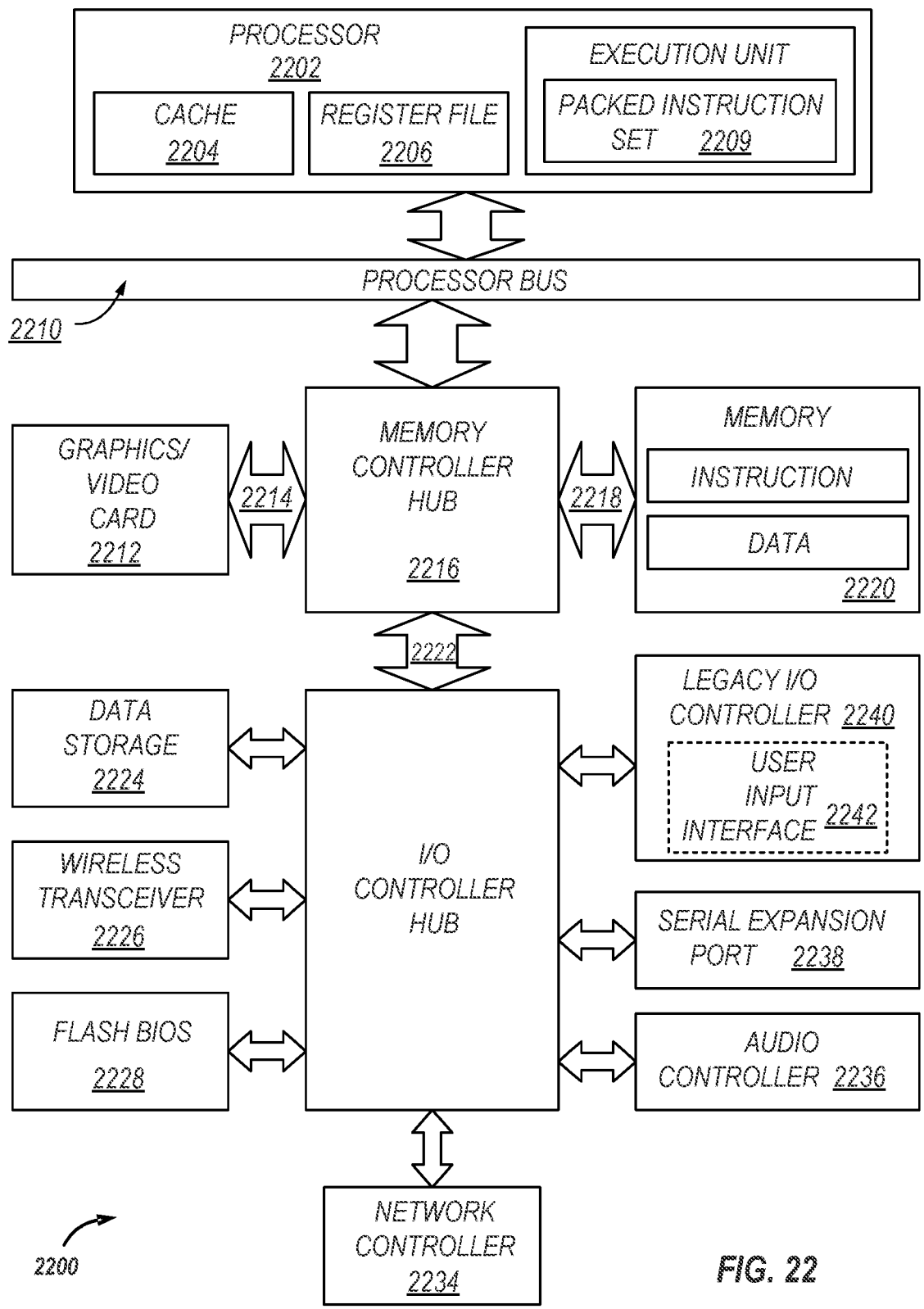
FIG. 22 illustrates another embodiment of a block diagram for a computing system including a processor.

Turning to FIG. 22, a block diagram of an exemplary computer system formed with a processor that includes execution units to execute an instruction, where one or more of the interconnects implement one or more features in accordance with one embodiment of the present invention is illustrated. System 2200 includes a component, such as a processor 2202 to employ execution units including logic to perform algorithms for process data, in accordance with the present invention, such as in the embodiment described herein. System 2200 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 2200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 2202 includes one or more execution units 2208 to implement an algorithm that is to perform at least one instruction. One embodiment may be described in the context of a single processor desktop or server system, but alternative embodiments may be included in a multiprocessor system. System 2200 is an example of a 'hub' system architecture. The computer system 2200 includes a processor 2202 to process data signals. The processor 2202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 2202 is coupled to a processor bus 2210 that transmits data signals between the processor 2202 and other components in the system 2200. The elements of system 2200 (e.g. graphics accelerator 2212, memory controller hub 2216, memory 2220, I/O controller hub 2224, wireless transceiver 2226, Flash BIOS 2228, Network controller 2234, Audio controller 2236, Serial expansion port 2238, I/O controller 2240, etc.) perform their conventional functions that are well known to those familiar with the art.

In one embodiment, the processor 2202 includes a Level 1 (L1) internal cache memory 2204. Depending on the architecture, the processor 2202 may have a single internal cache or multiple levels of internal caches. Other embodiments include a combination of both internal and external caches depending on the particular implementation and needs. Register file 2206 is to store different types of data in various registers including integer registers, floating point registers, vector registers, banked registers, shadow registers, checkpoint registers, status registers, and instruction pointer register.

Execution unit 2208, including logic to perform integer and floating point operations, also resides in the processor 2202. The processor 2202, in one embodiment, includes a microcode (ucode) ROM to store microcode, which when executed, is to perform algorithms for certain macroinstructions or handle complex scenarios. Here, microcode is potentially updateable to handle logic bugs/fixes for processor 2202. For one embodiment, execution unit 2208 includes logic to handle a packed instruction set 2209. By including the packed instruction set 2209 in the instruction set of a general-purpose processor 2202, along with associated circuitry to execute the instructions, the operations used by many multimedia applications may be performed using packed data in a general-purpose processor 2202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 2208 may also be used in micro controllers, embedded processors, graphics devices, DSPs, and other types of logic circuits. System 2200 includes a memory 2220. Memory 2220 includes a dynamic random access memory (DRAM) device, a static random access memory (SRAM) device, flash memory device, or other memory device. Memory 2220 stores instructions and/or data represented by data signals that are to be executed by the processor 2202.

Note that any of the aforementioned features or aspects of the invention may be utilized on one or more interconnect illustrated in FIG. 22. For example, an on-die interconnect (ODI), which is not shown, for coupling internal units of processor 2202 implements one or more aspects of the invention described above. Or the invention is associated with a processor bus 2210 (e.g. other known high performance computing interconnect), a high bandwidth memory path 2218 to memory 2220, a point-to-point link to graphics accelerator 2212 (e.g. a Peripheral Component Interconnect express (PCIe) compliant fabric), a controller hub interconnect 2222, an I/O or other interconnect (e.g. USB, PCI, PCIe) for coupling the other illustrated components. Some examples of such components include the audio controller 2236, firmware hub (flash BIOS) 2228, wireless transceiver 2226, data storage 2224, legacy I/O controller 2210 containing user input and keyboard interfaces 2242, a serial expansion port 2238 such as Universal Serial Bus (USB), and a network controller 2234. The data storage device 2224 can comprise a hard disk drive, a floppy disk drive, a CD-ROM device, a flash memory device, or other mass storage device.

Figure 23:
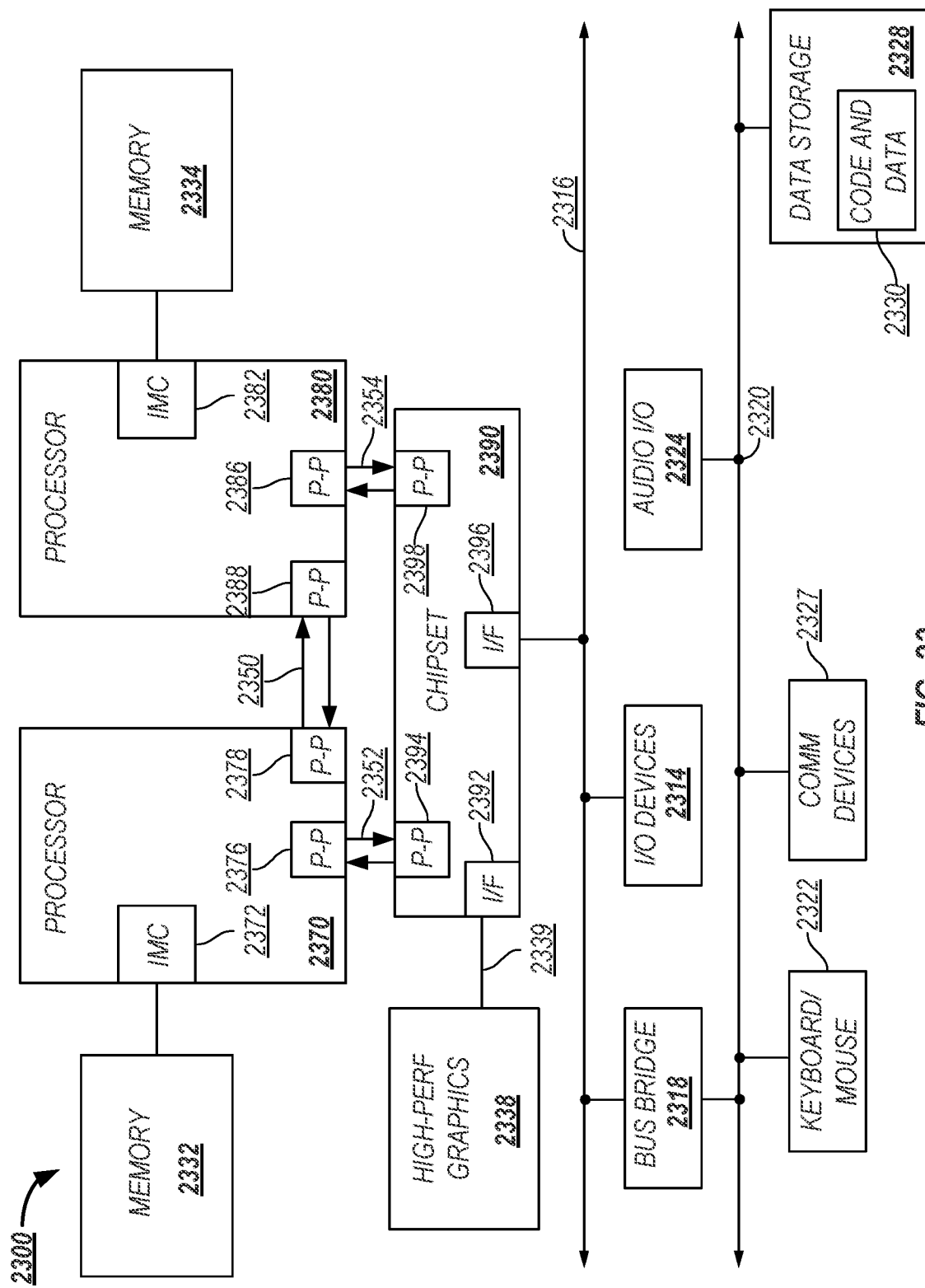
FIG. 23 illustrates an embodiment of a block for a computing system including multiple processors.

Referring now to FIG. 23, shown is a block diagram of a second system 2300 in accordance with an embodiment of the present invention. As shown in FIG. 23, multiprocessor system 2300 is a point-to-point interconnect system, and includes a first processor 2370 and a second processor 2380 coupled via a point-to-point interconnect 2350. Each of processors 2370 and 2380 may be some version of a processor. In one embodiment, 2352 and 2354 are part of a serial, point-to-point coherent interconnect fabric, such as a high-performance architecture. As a result, the invention may be implemented within the QPI architecture.

While shown with only two processors 2370, 2380, it is to be understood that the scope of the present invention is not so limited. In other embodiments, one or more additional processors may be present in a given processor.

Processors 2370 and 2380 are shown including integrated memory controller units 2372 and 2382, respectively. Processor 2370 also includes as part of its bus controller units point-to-point (P-P) interfaces 2376 and 2378; similarly, second processor 2380 includes P-P interfaces 2386 and 2388. Processors 2370, 2380 may exchange information via a point-to-point (P-P) interface 2350 using P-P interface circuits 2378, 2388. As shown in FIG. 23, IMCs 2372 and 2382 couple the processors to respective memories, namely a memory 2332 and a memory 2334, which may be portions of main memory locally attached to the respective processors.

Processors 2370, 2380 each exchange information with a chipset 2390 via individual P-P interfaces 2352, 2354 using point to point interface circuits 2376, 2394, 2386, 2398. Chipset 2390 also exchanges information with a high-performance graphics circuit 2338 via an interface circuit 2392 along a high-performance graphics interconnect 2339.

A shared cache (not shown) may be included in either processor or outside of both processors; yet connected with the processors via P-P interconnect, such that either or both processors' local cache information may be stored in the shared cache if a processor is placed into a low power mode.

Chipset 2390 may be coupled to a first bus 2316 via an interface 2396. In one embodiment, first bus 2316 may be a Peripheral Component Interconnect (PCI) bus, or a bus such as a PCI Express bus or another third generation I/O interconnect bus, although the scope of the present invention is not so limited.

As shown in FIG. 23, various I/O devices 2314 are coupled to first bus 2316, along with a bus bridge 2318 which couples first bus 2316 to a second bus 2320. In one embodiment, second bus 2320 includes a low pin count (LPC) bus. Various devices are coupled to second bus 2320 including, for example, a keyboard and/or mouse 2322, communication devices 2327 and a storage unit 2328 such as a disk drive or other mass storage device which often includes instructions/code and data 2330, in one embodiment. Further, an audio I/O 2324 is shown coupled to second bus 2320. Note that other architectures are possible, where the included components and interconnect architectures vary. For example, instead of the point-to-point architecture of FIG. 23, a system may implement a multi-drop bus or other such architecture.

Figure 24:
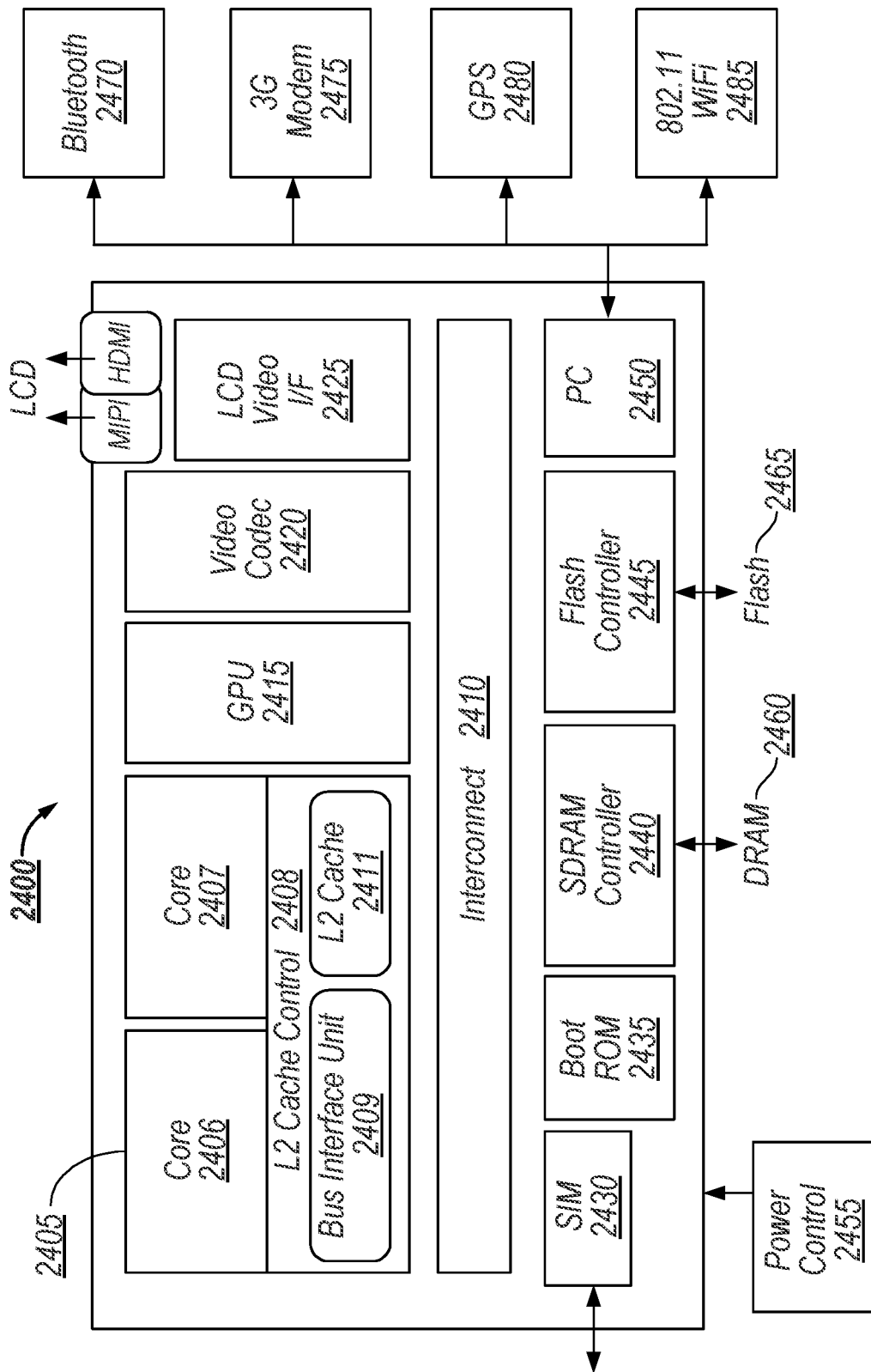
FIG. 24 illustrates an example system implemented as system on chip (SoC).

Turning next to FIG. 24, an embodiment of a system on-chip (SOC) design in accordance with the inventions is depicted. As a specific illustrative example, SOC 2400 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2400 includes 2 cores—2406 and 2407. Similar to the discussion above, cores 2406 and 2407 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2406 and 2407 are coupled to cache control 2408 that is associated with bus interface unit 2409 and L2 cache 2411 to communicate with other parts of system 2400. Interconnect 2410 includes an on-chip interconnect, such as an IOSF, AMBA, or other interconnect discussed above, which potentially implements one or more aspects of described herein.

Interface 2410 provides communication channels to the other components, such as a Subscriber Identity Module (SIM) 2430 to interface with a SIM card, a boot rom 2435 to hold boot code for execution by cores 2406 and 2407 to initialize and boot SOC 2400, a SDRAM controller 2440 to interface with external memory (e.g. DRAM 2460), a flash controller 2445 to interface with non-volatile memory (e.g. Flash 2465), a peripheral control 2450 (e.g. Serial Peripheral Interface) to interface with peripherals, video codecs 2420 and Video interface 2425 to display and receive input (e.g. touch enabled input), GPU 2415 to perform graphics related computations, etc. Any of these interfaces may incorporate aspects of the invention described herein.

In addition, the system illustrates peripherals for communication, such as a Bluetooth module 2470, 3G modem 2475, GPS 2485, and WiFi 2485. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to receive data on one or more data lanes of a physical link, receive a valid signal on another of the lanes of the physical link identifying that valid data is to follow assertion of the valid signal on the one or more data lanes, and receive a stream signal on another of the lanes of the physical link identifying a type of the data on the one or more data lanes.

In at least one example, physical layer logic is further to send a link state machine management signal over another of the lanes of the physical link.

In at least one example, the physical layer logic is further to send a sideband signal over a sideband link.

In at least one example, the type comprises a protocol associated with the data, wherein the protocol is one of a plurality of protocols utilizing the physical link.

In at least one example, the type comprises link layer packet data.

In at least one example, the data is to facilitate link state transitions for the physical link.

In at least one example, the physical layer logic is further to decode the stream signal to identify which of a plurality of different protocols applies to the data.

In at least one example, the physical layer logic is further to pass the data to upper layer protocol logic corresponding to a particular one of the plurality of protocols identified in the stream signal.

In at least one example, the apparatus includes link layer logic and other upper layer logic of each of the plurality of protocols in addition to the physical layer logic.

In at least one example, the plurality of protocols include at least two of Peripheral Component Interconnect (PCI), PCI Express (ale), Intel In-Die Interconnect (IDI), and Quick Path Interconnect (QPT).

In at least one example, the physical layer logic is further to determine errors in each of the plurality of protocols In at least one example, the physical layer logic is further to determine errors in one or more of the valid signal and the stream signal.

In at least one example, the physical layer logic is further to define a data window for data to be sent on the data lanes, and the data window corresponds to the valid signal.

In at least one example, the data window corresponds to a data symbol and the valid signal is to be asserted in a window immediately preceding the window in which the data is to be sent.

In at least one example, data is to be ignored on data lanes in a window immediately following a preceding window in which the valid signal is not asserted.

In at least one example, the window corresponds to a byte time period.

In at least one example, each of the valid signal, data, and the stream signal are aligned according to data windows defined for the physical link.

In at least one example, the stream signal is to be sent during the same window as the data.

In at least one example, the physical link connects two devices in a multi-chip package.

In at least one example, the physical layer logic is further to recenter signals on the lanes of the physical link.

In at least one example, the lanes are to be recentered based on the valid signal.

In at least one example, a stream signal is received on a dedicated stream signal lane of the data link during a second window, the stream signal is decoded, and a protocol associated with the data is determined from the decoding of the stream signal.

In at least one example, the data link is adapted to transmit data of a plurality of different protocols.

In at least one example, data to be sent on the data link is identified, a valid signal is sent on an outgoing valid signal lane of the data link during a particular window corresponding to the data to be sent, and the data is sent on dedicated outgoing data lanes during another window immediately subsequent to the particular window.

In at least one example, the plurality of data lanes further include a dedicated link state machine sideband lane.

In at least one example, the first device comprises a first die in a package and the second device comprises a second die in the package.

In at least one example, the first device comprises an on-package device and the second device comprises an off-package device.

One or more embodiments may provide an apparatus, a system, a machine readable storage, a machine readable medium, hardware- and/or software-based logic, and a method to identify data to be sent on dedicated data lanes of a data link, send a valid signal on a dedicated valid signal lane of the data link during a particular window that corresponds to data to be sent on the data link, send the data on dedicated data lanes of the data link during another window immediately subsequent to the particular window, and send a stream signal on a stream signal link that is encoded to identify a type of the data.

In at least one example, the valid signal is to indicate that data on the data lanes during the other window is valid data.

In at least one example, the stream signal link comprises a dedicated stream signal link.

In at least one example, the stream signal is adapted to identify whether a particular protocol is associated with the data.

In at least one example, the physical layer logic is included in a common physical layer and a plurality of protocols utilize the common physical layer, and the particular protocol is included in the plurality of protocols.

In at least one example, the plurality of protocols include two or more of PCI, PCIe, IDI, and QPI.

In at least one example, the stream signal is further adapted to identify whether the data comprises link layer packets.

In at least one example, the stream signal is further adapted to identify whether the data sideband data.

In at least one example, the physical layer logic is further to determine the type of the data and encode the stream signal to identify the determined type.

In at least one example, the physical layer logic is further to send link state machine side band (LSM¬_SB) signals on a dedicated LSM_SB lane of the data link.

In at least one example, the physical layer logic is further to send sideband signals on a sideband link separate from the data link.

In at least one example, the physical layer logic is further to send link layer data on the data lanes, wherein the link layer data is used to transition the data link from a first link state to a second link state.

In at least one example, the first link state comprises an active link state and the second link state comprises a low power link state.

In at least one example, the physical layer logic is further to identify a first data window corresponding to the valid signal and send the data on the data lanes within a second data window immediately subsequent to the first data window.

In at least one example, not asserting the valid signal indicates that data on the data lanes in an immediately subsequent window is to be ignored as invalid.

In at least one example, each of the first and second data windows is defined to correspond to a byte time period.

In at least one example, each of the valid signal, data, and the stream signal are aligned according to data windows defined for the physical link.

In at least one example, the stream signal is to be sent during the same window as the data.

In at least one example, the physical layer logic is further to generate each of the valid and the stream signal.

In at least one example, the data link connects two devices in a multi-chip package.

In at least one example, the data link is to support data speeds exceeding 8 Gb/s.

One or more embodiments may provide an apparatus, a system, a machine readable storage, a machine readable medium, hardware- and/or software-based logic, and a method to provide single-ended signaling on a data link including a plurality of lanes including a plurality of data lanes, one or more valid signal lanes, one or more stream lanes, and distribute a clock signal for use by the plurality of lanes, where signals sent on each of the plurality of lanes are to be aligned with the clock signal.

In at least one example, each of the data lanes is terminated mid-rail to a regulated voltage.

In at least one example, the regulated voltage is provided for each of the plurality of data lanes by a single voltage regulator.

In at least one example, the regulated voltage is substantially equal to Vcc/2, where Vcc comprises a supply voltage.

In at least one example, the physical layer logic is to attempt to provide crosstalk cancellation between two or more of the plurality of data lanes.

In at least one example, crosstalk cancellation is provided by adding a weighted high-pass filtered aggressor signal on a first of the two or more data lanes to the signal of a second of the two or more data lanes.

In at least one example, the physical layer logic is to generate the weighted high-pass filtered aggressor signal at least in part using a resistor-capacitor (RC) low pass filter.

In at least one example, the physical layer logic is to provide per bit duty cycle correction.

In at least one example, the physical layer logic is to detect skew on at least a particular one of the data lanes and deskew the particular data lane.

In at least one example, the physical layer logic is further to apply AC data bus inversion (DBI) to at least one of the data lanes.

In at least one example, the clock signal comprises a half rate forwarded clock signal.

In at least one example, the physical layer logic is further to provide electrostatic discharge protection.

In at least one example, the physical layer logic is implemented at least in part through hardware circuits.

In at least one example, valid signals are to be transmitted on the valid signal lanes and each valid signal identifies that valid data is to follow assertion of the valid signal on the plurality of data lanes, and stream signals are to be transmitted on the stream signal lanes and each stream signal identifies a type of the data on the one or more data lanes.

In at least one example, the data link is to support data speeds exceeding 8 Gb/s.

One or more embodiments may provide an apparatus, a system, a machine readable storage, a machine readable medium, hardware- and/or software-based logic, and a method to provide single-ended signaling on a data link including a plurality of lanes including a plurality of data lanes, one or more valid signal lanes, one or more stream lanes, and one or more link state machine sideband lanes, distribute a clock signal for use by the plurality of lanes, wherein signals sent on each of the plurality of lanes are to be aligned with the clock signal, provide crosstalk cancellation between two or more of the plurality of data lanes, and provide per bit duty cycle correction for the data link, where each of the data lanes is terminated mid-rail to a regulated voltage.

In at least one example, the physical layer logic is further to detect skew on at least a particular one of the data lanes and deskew the particular data lane.

One or more embodiments may provide an apparatus, a system, a machine readable storage, a machine readable medium, hardware- and/or software-based logic, and a method to identify that respective upper layers of each of a plurality of layered protocols request transition of a data link from an active link state to a low power link state, wherein each of the plurality of layered protocols is to utilize the data link as a physical layer, and transition the data link from the active link state to the low power link state based on an identification that the upper layers of each of the plurality of layered protocols request transition to the low power link state.

In at least one example, the physical layer logic is further to participate in a handshake with another device to cause the data link to transition to the low power link state.

In at least one example, the handshake comprises a link layer handshake.

In at least one example, the physical layer logic is to send link layer data in the link layer handshake while the data link is the active link state.

In at least one example, the physical layer logic is to send a stream signal substantially concurrent with the link layer data to identify that data sent on data layers of the data link comprise link layer packets.

In at least one example, the stream signal is sent on a dedicated stream signal lane of the data link during a particular window, wherein the link layer data is also sent during the particular window.

In at least one example, the physical layer logic is to send a valid signal on a dedicated valid signal lane of the data link, wherein the valid signal is sent in another window immediately preceding the particular window to indicate that data sent in the particular window is valid.

In at least one example, the handshake comprises a handshake communication over a sideband link.

In at least one example, the handshake comprises a link layer handshake and the handshake communication over the sideband link.

In at least one example, the handshake communication over the sideband link confirms the link layer handshake.

In at least one example, the physical layer logic is further to identify a request to transition the data link from the active link state to the low power link state from an upper layer of a first one of the plurality of layered protocols.

In at least one example, the physical layer logic is further to wait to transition the data link from the active link state to the low power link state until requests are received from each of other protocol in the plurality of layered protocols.

In at least one example, the physical layer logic is to track, for each of the plurality of layered protocols, whether the protocol has requested to transition the data link from the active link state to the low power link state.

In at least one example, the physical layer logic is further to generate a response to the request confirming transition of the data link from the active link state to the low power link state prior to the actual transition of the data link from the active link state to the low power link state.

In at least one example, the response is sent while approval of the transition of the data link from the active link state to the low power link state is outstanding from one or more of the other protocols in the plurality of layered protocols.

In at least one example, the low power link state comprises an idle link state.

In at least one example, the plurality of layered protocols include one or more of PCI, PCIe, IDI, and QPI.

A system can be provided to include a data link comprising a plurality of lanes, first device, and a second device communicatively coupled to the first device using the data link, the second device including upper layer logic of a first protocol, upper layer logic of a second protocol, where each of the plurality of protocol stacks utilize a common physical layer, and physical layer logic for the common physical layer, wherein the physical layer logic is to determine that each of the protocols, including the first and second protocols, utilizing the data link approves transitioning the data link from an active link state to a low power link state prior to transitioning the data link to the low power link state.

In at least one example, the plurality of lanes include a plurality of data lanes, one or more valid signal lanes, one or more stream lanes.

In at least one example, valid signals are to be transmitted on the valid signal lanes and each valid signal identifies that valid data is to follow assertion of the valid signal on the plurality of data lanes, and stream signals are to be transmitted on the stream signal lanes and each stream signal identifies a type of the data on the one or more data lanes.

In at least one example, transitioning the data link to the low power link state comprises a handshake between the first and second devices.

In at least one example, the handshake comprises a link layer handshake and sideband handshake.

In at least one example, the first device comprises a first die in a package and the second device comprises a second die in the package.

In at least one example, the first device comprises an on-package device and the second device comprises an off-package device.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a physical layer interface, implemented at least in part in hardware, the physical layer interface comprising:
   a clock lane to support a clock signal;
   a control interface to support one or more control signals, wherein the one or more control signals comprise control signals to cause transitions in link states according to a state machine;
   a plurality of data lanes to transmit data; and
   a valid signal lane to support transmission of a valid signal, wherein transmission of data on the data lanes is to be aligned with transmission of the valid signal on the valid signal lane, and at least the clock lane and the valid signal lane are separate from the plurality of data lanes.

2. The apparatus of claim 1, further comprising physical layer logic to generate the valid signal.

3. The apparatus of claim 2, wherein the physical layer logic is to manage training of a link comprising the plurality of data lanes.

4. The apparatus of claim 3, wherein the link states comprise a plurality of link training states, and the link training states are used in training of the link.

5. The apparatus of claim 4, wherein a particular one of the plurality of link training states comprises a low power state in which no data is to be sent on the link.

6. The apparatus of claim 3, wherein training of the link comprises sending and receiving training sequences on the link.

7. The apparatus of claim 1, wherein the control signals comprise sideband control signals.

8. The apparatus of claim 1, wherein the physical layer interface comprises a physical layer abstraction.

9. The apparatus of claim 1, further comprising a transmitter to transmit the valid signal and transmit the particular data on the plurality of data lanes aligned with the valid signal.

10. An apparatus comprising:
an interface implemented in hardware, the interface comprising:
a clock signal lane to receive a clock signal;
a control interface to receive one or more control signals, wherein the one or more control signals comprise control signals to cause transitions in link states according to a state machine;
a plurality of data lanes to receive data transmitted on a link by another device; and
a valid signal lane to receive a valid signal corresponding to the data, wherein transmission of data on the data lanes is to be aligned with transmission of the valid signal on the valid signal lane.

11. The apparatus of claim 10, further comprising physical layer logic to identify receipt of the valid signal on the valid signal lane, and process the data received on the plurality of data lanes based on receipt of the valid signal.

12. The apparatus of claim 10, wherein the control signal comprises a sideband signal.

13. The apparatus of claim 10, wherein the valid signal is aligned with an edge in the clock signal.

14. The apparatus of claim 10, wherein the link states comprise link training states.

15. The apparatus of claim 14, wherein training sequences are to be sent and received by the apparatus during one or more of the link training states.

16. The apparatus of claim 15, wherein the training sequences are according to a defined interconnect protocol.

17. The apparatus of claim 16, wherein the defined interconnect protocol comprises one of a plurality of different interconnect protocols supported using the interface.

18. A method comprising:
sending a clock signal on a dedicated clock lane of an interface;
sending a control signal on a control lane, wherein the control signal is to cause transitions in link states according to a state machine;
identifying data to be sent on a plurality of data lanes of the interface;
sending a valid signal on a dedicated valid lane of the interface, wherein the valid signal corresponds to the particular data; and
sending the particular data on the plurality of data lanes to align with the valid signal.

19. A system comprising:
means for sending a clock signal on a dedicated clock lane of an interface;
means for sending a control signal on a control lane, wherein the control signal is to cause transitions in link states according to a state machine;
means for identifying data to be sent on a plurality of data lanes of the interface;
means for sending a valid signal on a dedicated valid lane of the interface, wherein the valid signal corresponds to the particular data; and
means for sending the particular data on the plurality of data lanes to align with the valid signal.

20. A system comprising:
a first computing device;
a second computing device connected to the first computing device by a link, wherein the second computing device comprises a physical layer interface to support the link, and the physical layer interface comprises:
a clock signal lane to receive a clock signal;
a control interface to receive one or more control signals, wherein the one or more control signals comprise control signals to cause transitions in link states according to a state machine;
a plurality of data lanes to receive data transmitted on a link by another device; and
a valid signal lane to receive a valid signal corresponding to the data, wherein transmission of data on the data lanes is to be aligned with transmission of the valid signal on the valid signal lane.

21. The system of claim 20, wherein the second computing device comprises a processor.

22. The system of claim 21, wherein the first computing device comprises a second processor.

23. The system of claim 20, wherein the second computing device comprises a memory controller.

24. The system of claim 20, wherein the second computing device comprises a graphics processor.

25. The system of claim 20, wherein the second computing device comprises a network controller.

* * * * *